United States Patent [19]
Ohtuka et al.

[11] Patent Number: 5,894,087
[45] Date of Patent: Apr. 13, 1999

[54] SPEED SENSOR FOR WATERCRAFT

[75] Inventors: Kenichi Ohtuka; Sumihiro Takashima, both of Shizuoka, Japan

[73] Assignee: Yamaha Hatsudoki Kabushiki Kaisha, Japan

[21] Appl. No.: 08/843,599

[22] Filed: Apr. 16, 1997

[30] Foreign Application Priority Data

Apr. 16, 1996 [JP] Japan ................................. 8-094277

[51] Int. Cl.[6] .................................................. G01C 21/00
[52] U.S. Cl. ............................. 73/185; 73/488; 73/178 R
[58] Field of Search ........................... 73/178 R, 181, 73/185, 187, 488, 521, 530

[56] References Cited

U.S. PATENT DOCUMENTS

| | | |
|---|---|---|
| 3,164,016 | 1/1965 | Dinsmore . |
| 3,292,373 | 12/1966 | Tado . |
| 3,349,615 | 10/1967 | Finkl . |
| 3,601,989 | 8/1971 | Austin .................... 60/221 |
| 4,070,909 | 1/1978 | Carpenter . |
| 4,100,877 | 7/1978 | Scott et al. ................ 60/221 |
| 5,176,548 | 1/1993 | Morgan . |
| 5,187,978 | 2/1993 | Tendler ..................... 73/187 |
| 5,244,425 | 9/1993 | Tasaki et al. ............. 440/47 |
| 5,295,877 | 3/1994 | Kanno ..................... 73/182 |
| 5,369,360 | 11/1994 | Amyot ..................... 73/187 |
| 5,433,635 | 7/1995 | Kobayashi . |
| 5,699,749 | 12/1997 | Yamada et al. . |

Primary Examiner—Max H. Noori
Attorney, Agent, or Firm—Knobbe, Martens, Olson & Bear, LLP

[57] ABSTRACT

An arrangement of a speed sensor on a personal watercraft better shields the sensor from damage while simplifying the layout and arrangement of the sensor on the underside of the watercraft hull. The hull includes a pump chamber formed in part by a front wall. The speed sensor is attached to the wall with a portion of the sensor projecting below a housing of the sensor. A ride plate covers a lower opening of the pump chamber and fits about the sensor housing. In this location, the speed sensor does not interfere with the arrangement or operation of steering or trim mechanisms used with a jet propulsion unit housed within the pump chamber. The speed sensor also is generally protected in this location and is not visible from the rear of the watercraft to improve the watercraft's aesthetics.

21 Claims, 21 Drawing Sheets

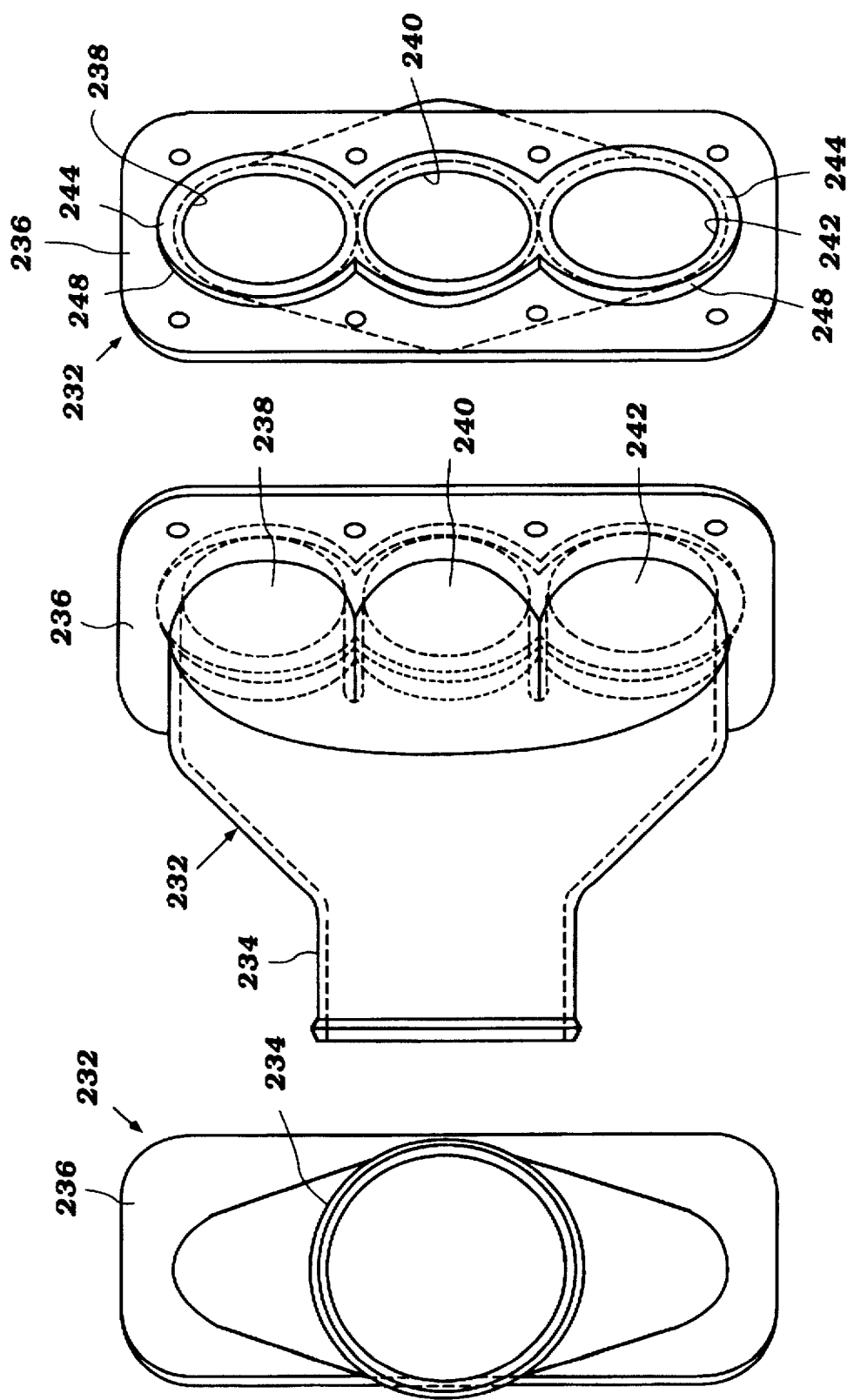

SPEED SENSOR FOR WATERCRAFT

BACKGROUND OF THE INVENTION

1. Field of the Invention

The present invention relates in general to watercraft, and in particular to an improved speed sensor for a personal watercraft.

2. Description of Related Art

Personal watercraft have become popular in recent years. This type of watercraft is sporting in nature; it turns swiftly, is easily maneuverable, and accelerates quickly. Personal watercraft today commonly carry one rider and one or two passengers.

A relatively light weight, small hull of the personal watercraft defines an engine compartment below a rider's area. An internal combustion engine frequently lies within the engine compartment in front of a tunnel formed on the underside of the watercraft hull. The internal combustion engine commonly powers a jet propulsion device located within the tunnel. An impeller shaft commonly extends between the engine and the propulsion device for this purpose. Such small watercraft today are capable of traveling at high rates of speed.

Personal watercraft often include some types of instrumentation to optimize the performance of the watercraft, as well as to monitor various operational characteristics of the watercraft's performance. In this regard, the personal watercraft usually includes a speedometer not only to allow the operator to monitor the speed of the watercraft, but also to control trim and other factors in order to maintain optimum performance.

Most speed indicators require a component of the indicator to be mounted on the underside of the hull. In this position, the component lies within the water and generates a signal indicative of the watercraft's speed. The hull of a personal watercraft, however, does not have large areas on which to mount conventional speed sensors. Most of the practical surface on the underside of the hull is occupied by the jet pump unit that is positioned within the tunnel.

As a result of the limited space on the underside of the hull, speed indicators are usually mounted proximate to the stern of the watercraft, near a nozzle section of the jet pump unit (see FIG. 23 of the appended drawings). This location of the speed indicator, however, often results in an overly complicate layout of the steering nozzle and of the associated lever and cable in order to work around the speed indicator. In addition, the speed indicator extends below the planing surface of the lower hull at this location and consequently is susceptible to damage. The speed indicator is also visible from the rear of the watercraft when mounted at this location, which lessens the appearance of watercraft.

SUMMARY OF THE INVENTION

A need therefore exists for an improved and simplified arrangement of a speed indicator on a personal watercraft.

One aspect of the present invention thus involves a watercraft comprising a hull. The hull defines a pump chamber which is formed on its underside. The pump chamber extends from a front wall and terminates at an aft opening located at an aft end of the hull. A jet propulsion unit is positioned at least partially within the pump chamber. The jet propulsion unit has a discharge nozzle positioned near the aft opening to discharge water through the opening in order to propel the watercraft. A ride plate is attached to the underside of the hull and is sized to at least partially close an underside of the pump chamber. The ride plate includes an aperture that lies near the front wall. A speed sensor is mounted to the front wall of the pump chamber with a portion of the speed sensor exposed through the aperture. In this position, the speed sensor does not interfere with the arrangement or operation of steering or trim mechanisms used with the discharge nozzle. The speed sensor also is generally protected in this location and is not visible from the rear of the watercraft.

Further aspects, features, and advantages of the present invention will become apparent from the detailed description of the preferred embodiments which follows.

BRIEF DESCRIPTION OF THE DRAWING

The above-mentioned and other features of the invention will now be described with reference to the drawings of a preferred embodiment of the present watercraft. The illustrated embodiment is intended to illustrate, but not to limit the invention. The drawings contain the following figures:

FIG. 16 is a rear perspective view of a discharge pipe illustrated in FIG. 15;

FIG. 17 is front perspective view of the discharge pipe of FIG. 15;

FIG. 18 is a rear plan view of the discharge pipe of FIG. 15;

DETAILED DESCRIPTION OF PREFERRED EMBODIMENT

Figure 1:
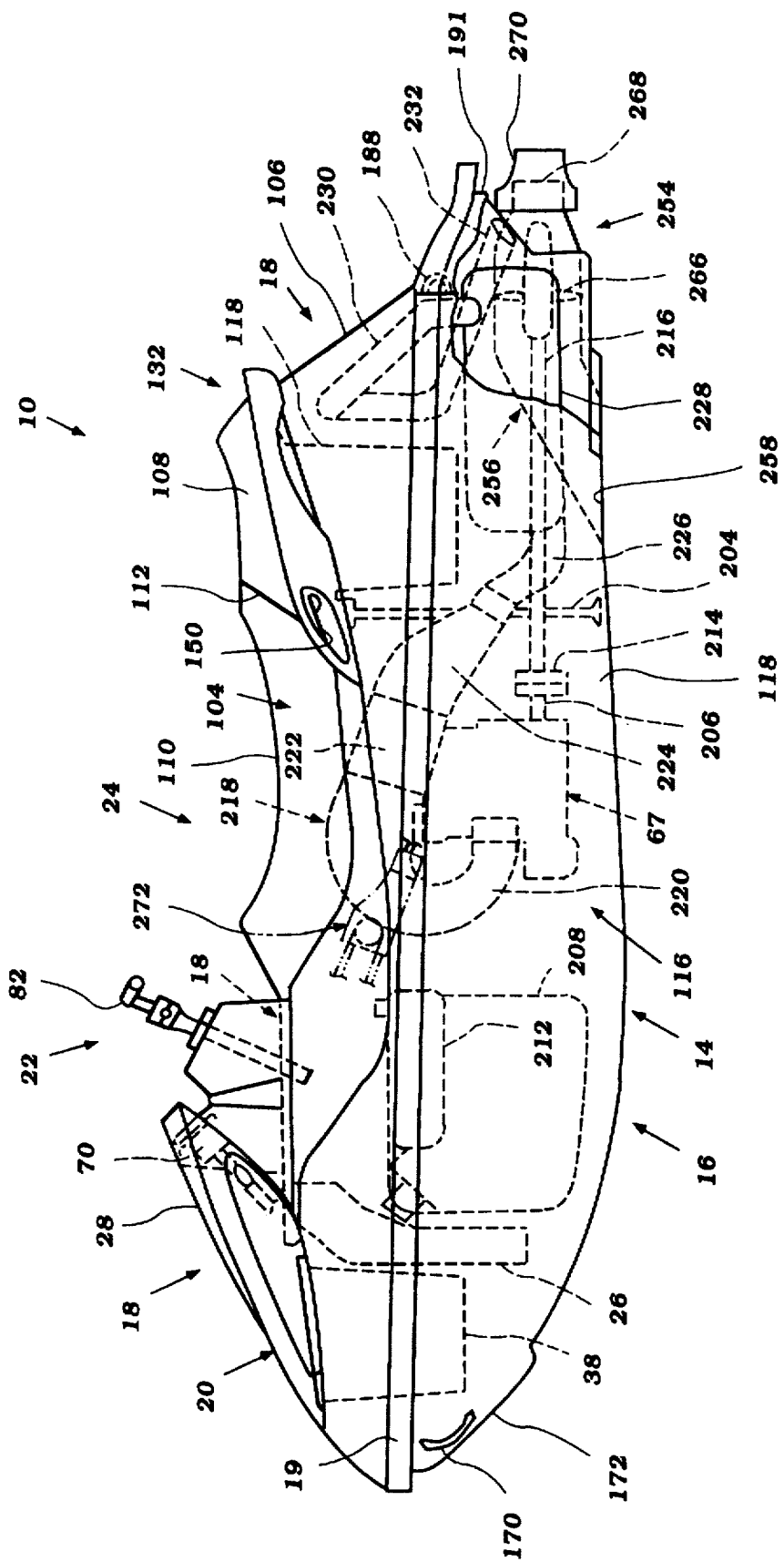
FIG. 1 is a side elevational view of a personal watercraft configured in accordance with a preferred embodiment of the present invention, and illustrates several internal components of the watercraft in phantom.
Figure 2:
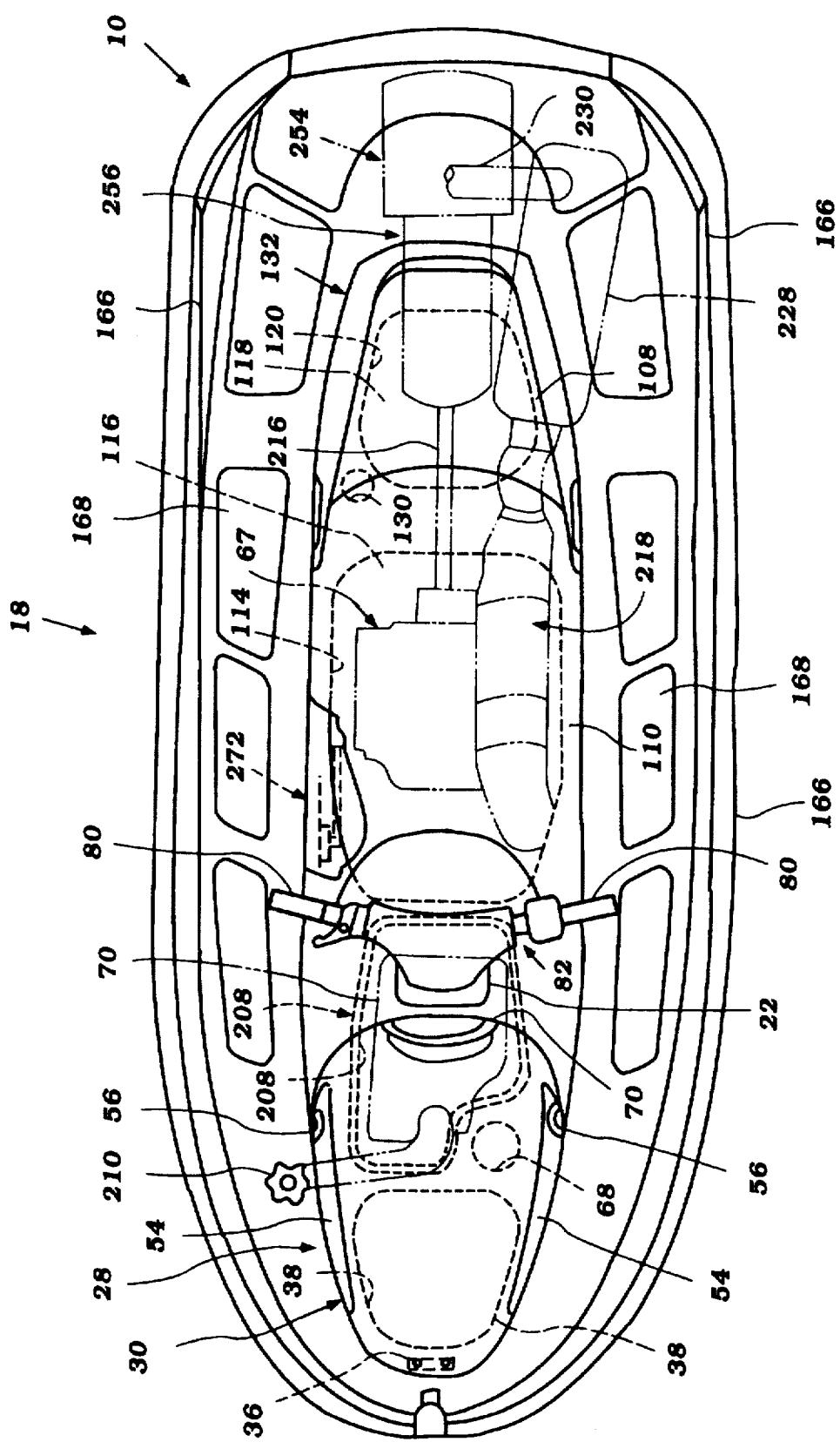
FIG. 2 is a top plan view of the personal watercraft of FIG. 1 with several internal components of the watercraft illustrated in phantom.

FIGS. 1 and 2 illustrate a watercraft incorporating a speed sensor configured in accordance with a preferred embodiment of the present invention. The present speed sensor has particular utility with a personal watercraft, and therefore is illustrated in connection with such a vehicle. It is contemplated, however, that the present speed sensor can be use with other types of vehicles as well, such as, for example, but without limitation, small jet boats and the like.

With initial reference to FIGS. 1 and 2, the watercraft 10 includes a hull 14 formed by a lower hull section 16 and an upper deck section 18. The hull sections 16, 18 are formed from a suitable material such as, for example, a molded fiberglass reinforced resin. The lower hull section 16 and the upper deck section 18 are fixed to each other around the peripheral edges 19 in any suitable manner.

As viewed in the direction from the bow to the stem of the watercraft, the upper deck section 18 includes a bow portion 20, a control mast 22 and a rider's area 24. The bow portion 20 slopes upwardly toward the control mast 22 and includes at least one air duct 26 through which air can enter the hull 14. A lid or cover 28 desirably extends above an upper end of the air duct 26 to inhibit an influx of water into the hull 14.

FIGS. 3-6 illustrate in more detail the lid 28 which extends over the bow portion of the upper deck 18. As illustrated therein, the lid 28 has an outer surface defined by a top panel 30. The top panel 30 defines a generally smooth outer surface and is shaped to cooperate with the remainder of the upper deck 18, as illustrated in FIG. 1, so that the bow of the watercraft presents an aerodynamic design.

Figure 3:
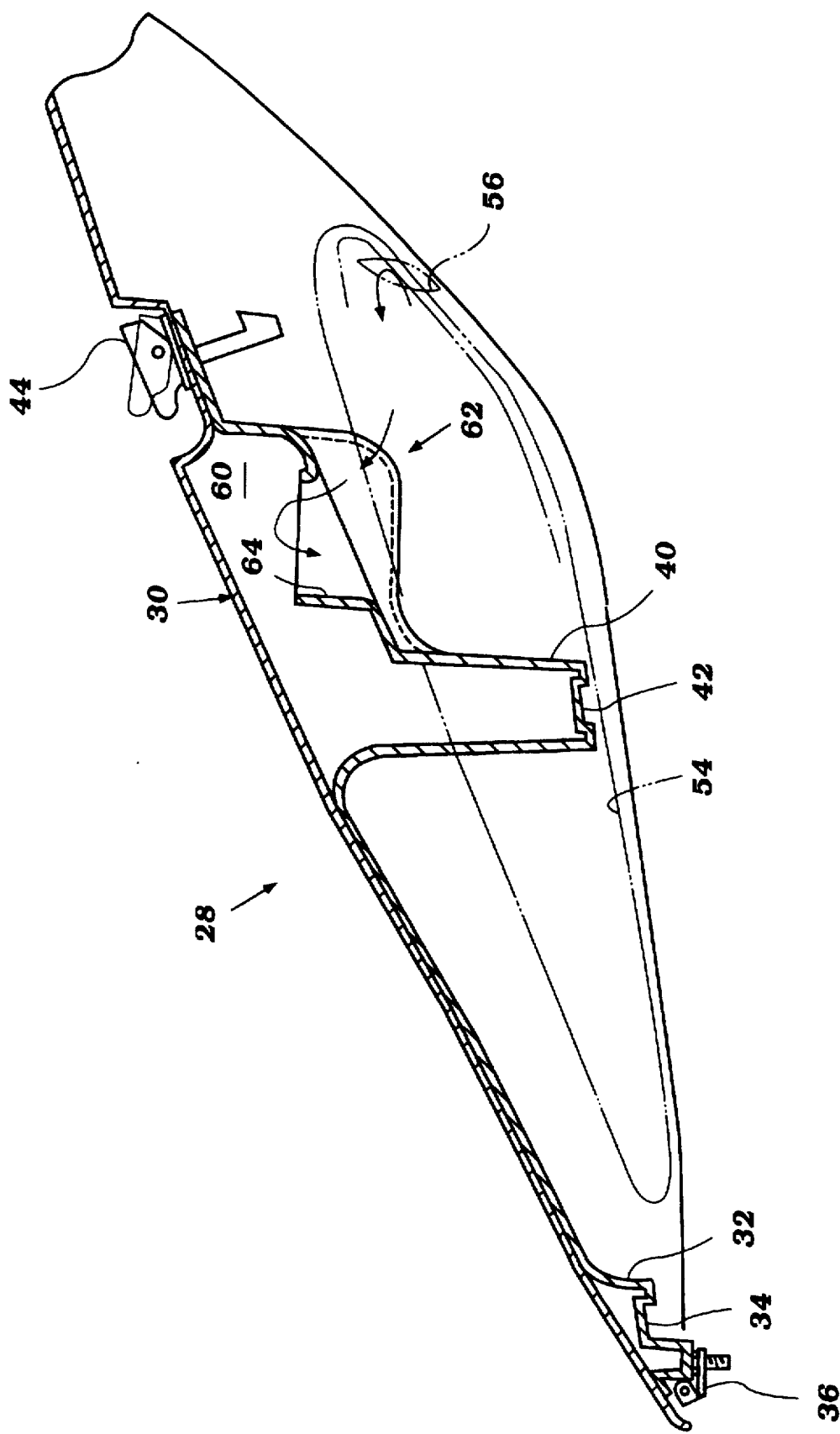
FIG. 3 is a cross-sectional view of an upper deck lid of the watercraft of FIG. 1, taken along the length of the lid.

Other panel members are connected to the top panel 30 for reinforcing the top panel 30, for supporting the top panel 30 above the bow portion 20 of the upper deck 18 of the watercraft, and for directing air through the lid 28 to an air intake, as described in more detail below. As illustrated in FIG. 3, a first support panel 32 is connected to the front end of the top panel 30 and includes a downward extending flange 34 which has a hinge element 36 connected thereto. The hinge element 36 is also connected to the bow portion 20 of the deck 18, whereby the lid 28 is hinged at its front end to the bow portion 20 of the upper deck 18.

Figure 4:
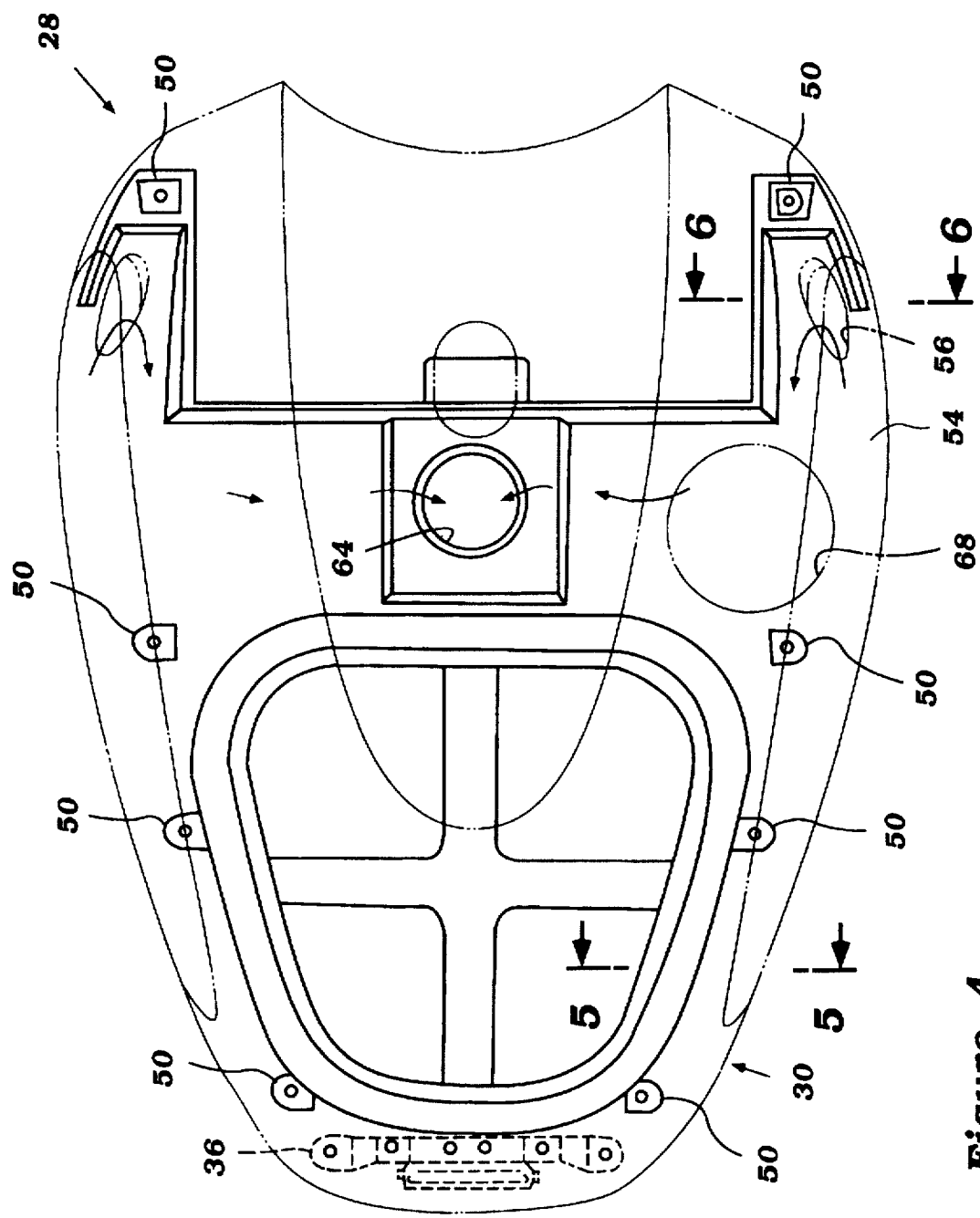
FIG. 4 is a top plan view of the upper deck lid with an outer panel of the cover illustrated in phantom.

The first support panel 32 extends along the bottom of the top panel 30 to define an open space under the lid corresponding to that portion of the lid 28 which extends over a front storage box 38 positioned in the bow of the watercraft 10, as illustrated in FIGS. 1 and 4. Thereafter, the first support panel 32 includes a second downward extending flange 40 which has a portion 42 which is also adapted to rest upon the bow portion 20 of the upper deck 18 for supporting the lid 28.

As illustrated in FIG. 3, a latch 44 is mounted to the lid 28 generally opposite its front, hinged end. The latch 44 is adapted to selectively engage the bow portion 20 of the upper deck 18. When the latch 44 engages the bow portion 20 of the upper deck 18, the lid 28 is prevented from opening. When the latch 44 is disengaged, an operator may raise the lid 28, rotating it about the hinge 36 and exposing the storage box 38 thereunder.

Figure 5:
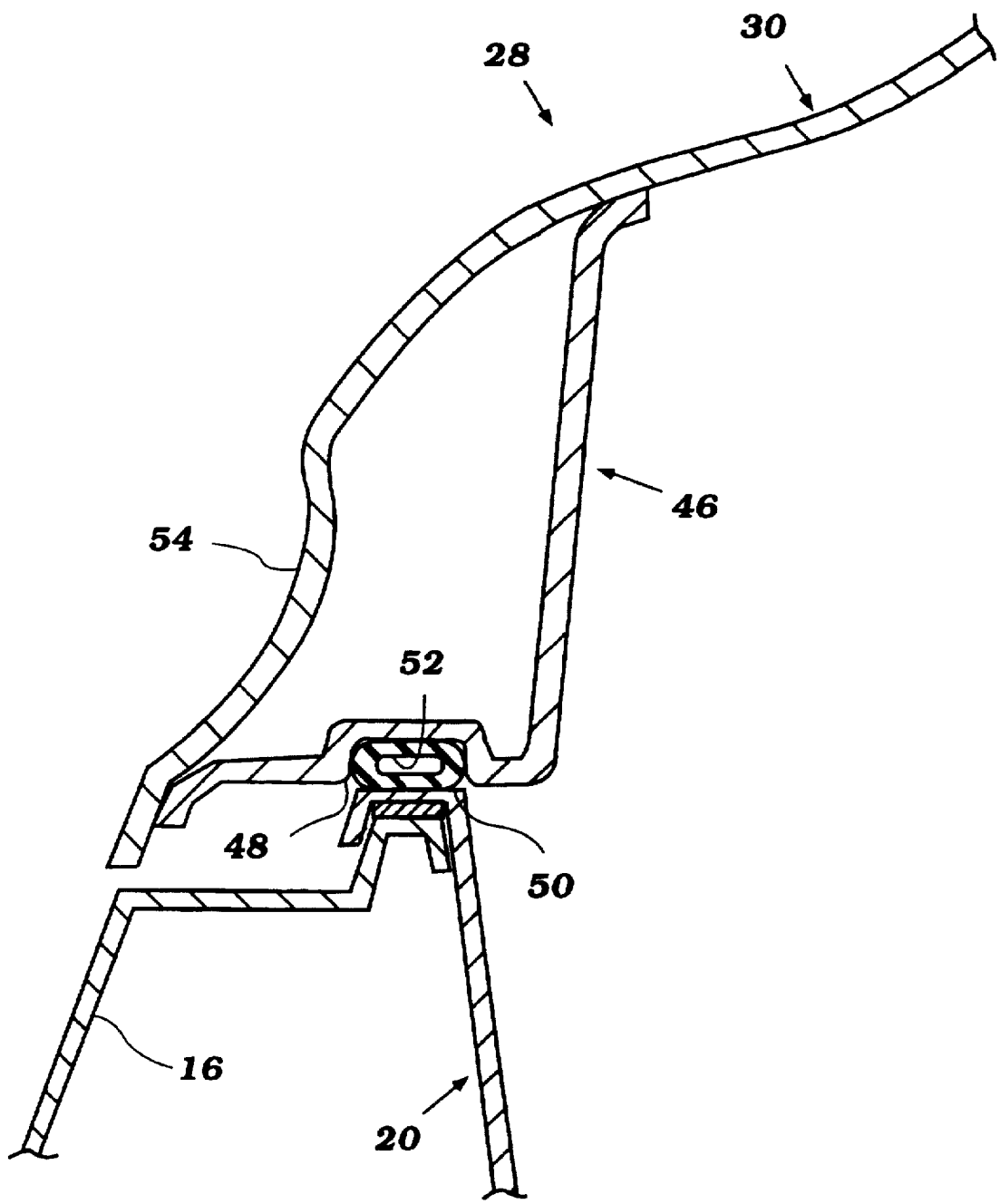
FIG. 5 is a cross-sectional view of a portion of the upper deck and the lid taken along line 5—5 of FIG. 4.

As illustrated in FIG. 5, other support panels 46 are connected to the bottom of the top panel 30 and extend downward therefrom. These support panels 46 have a base or foot portion 48 which is adapted to rest upon a boss 50 of the bow portion 20 of the upper deck 18. Preferably, the base portion 48 of the support panel 46 includes a recessed section for accommodating a pad 52 between it and the boss 50.

Figure 6:
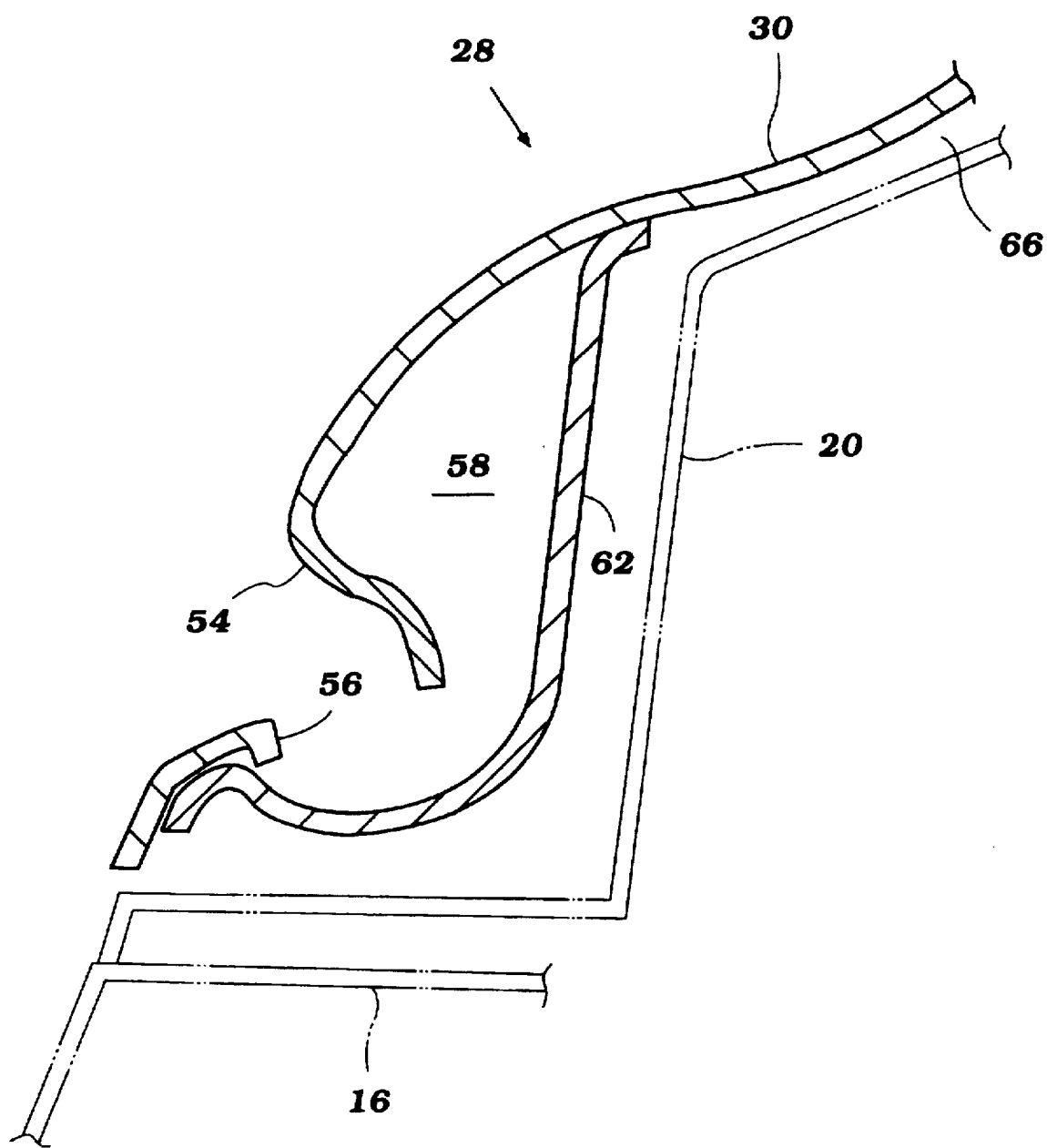
FIG. 6 is a cross-sectional view of a portion of the upper deck and the lid taken along line 6—6 of FIG. 4.

As best illustrated in FIGS. 4 and 5, a scoop-shaped recess 54 is defined by the top panel 30 of the lid 28 on each side thereof. Each scoop 54 extends generally along the side of the lid 28 from its front end towards its rear end. As illustrated in FIGS. 4 and 6, an air inlet 56 is provided through the top panel 30 of the lid 28 at the end of each scoop 54 nearest the rear end of the lid 28.

A passage 58 is defined from each inlet 56 to a chamber 60. Each passage 58 and the chamber 60 are defined under the lid 58 by the top panel 30 and an inner panel 62. As illustrated in FIG. 6, the inner panel 62 is positioned under the top panel 30, but generally adjacent thereto, near the inlets 54, thereby defining the passage 58. In addition, as illustrated in FIG. 3, the inner panel 62 cooperates with the top panel 30 to define the chamber 60, which is at the end of the passages leading from the inlets 56. The inner panel 62 has a port 64 formed therein leading from the chamber 60 to a space between the lid 28 and the bow portion 20 of the upper deck 18.

The inner panel 62 is arranged so as to cooperate with the bow portion 28 of the upper deck 18 to form a passage 66 (see FIG. 6) between the lid 28 and the bow portion 20 of the upper deck 18 leading to an inlet 68 of the air pipe 26 extending through the bow portion 20 of the upper deck 18. As illustrated in FIG. 1, this inlet 68 directs air through the air pipe 26 to the engine positioned in the watercraft 10.

This lid arrangement is such that when the watercraft 10 is moving in the forward direction, air is directed along the scoops 54 into the inlets 56. The air is then directed through the passages 58 defined in the lid 28 to the chamber 60 in the lid 28. The air then passes through the port 64 into the passage or space 66 between the lid 28 and the bow portion 20 of the upper deck 18, where it is directed into the inlet 68 of the air pipe 26, and through the air duct 26 to the engine 67.

As a further aspect of the lid 28 described in more detail below, the top panel 30 of the lid preferably extends rearward a sufficient distance to serve as a shield to a display of the watercraft 10. In addition, it is preferred that a seal (not shown) be positioned between the bow portion 20 of the deck 10 and the lid 28 around the front storage box 38 for preventing the entry of water and other material into the storage box, as is well known to those skilled in the art.

As seen in FIG. 1, a fuel tank is located within the hull 14 beneath the cover. Conventional means, such as, for example, straps, secure the fuel tank to the lower hull 16. A fuel filler hose extends between a fuel cap assembly and the fuel tank. In the illustrated embodiment, the filler cap assembly (FIG. 2) is secured to the bow portion 20 of the hull upper deck 18 to the side and in front of the control mast 22. In this manner, the fuel tank can be filled from outside the hull 14 with the fuel passing through the fuel filler hose into the tank.

The control mast 22 extends upward from the bow portion 20 and supports a handlebar assembly. The handlebar controls the steering of the watercraft 10 in a conventional manner. The handlebar assembly also carries a variety of controls of the watercraft 10, such as, for example, a throttle control, a start switch and a lanyard switch.

Figure 7:
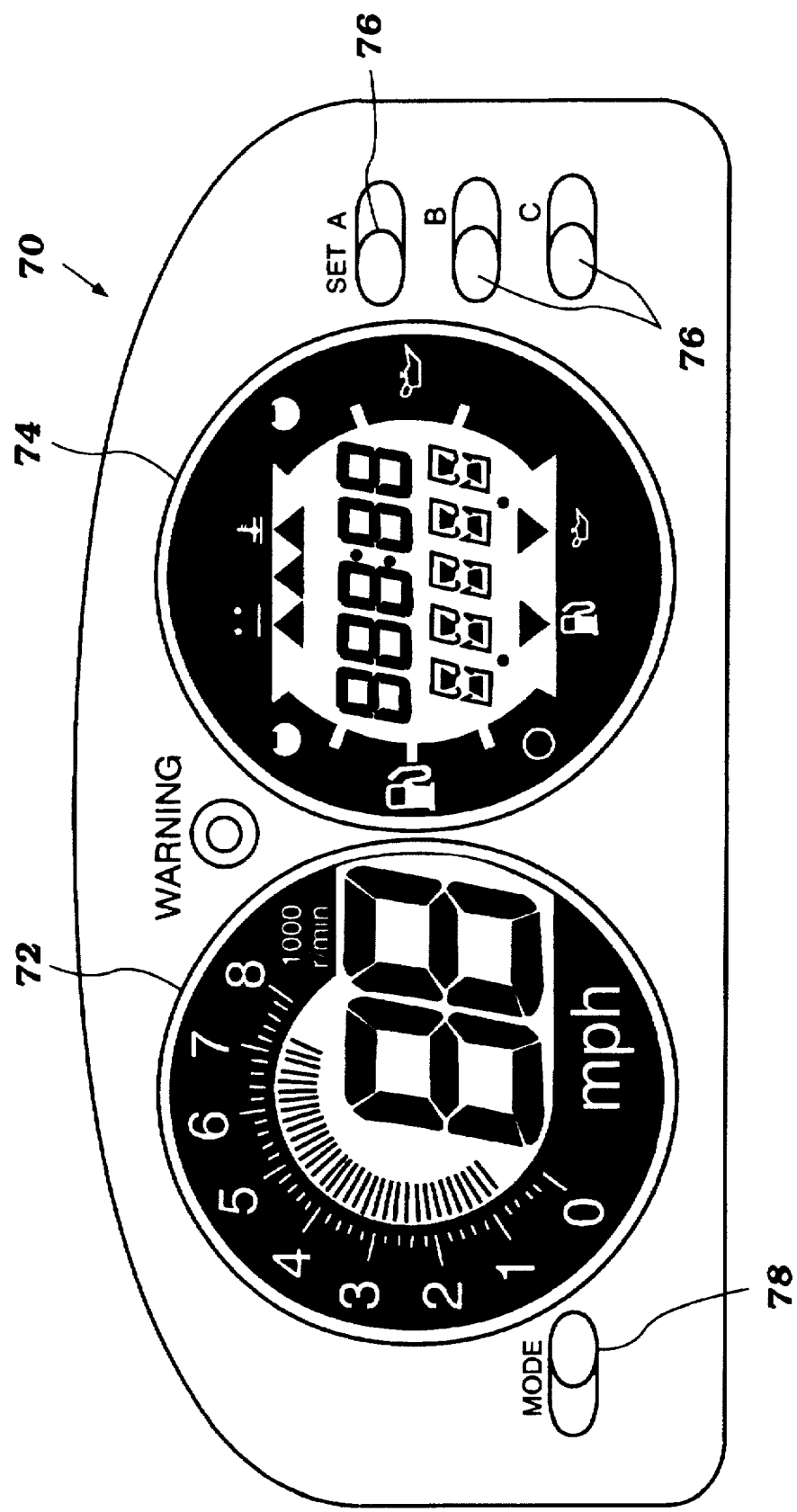
FIG. 7 is a plan view of a display panel of the watercraft illustrated in FIG. 1.

FIG. 7 illustrates a display panel 70 of the watercraft 10 in accordance with the present invention. As best illustrated in FIG. 1, the display panel 70 is mounted to the bow portion 20 of the upper deck 18 of the watercraft 10, generally forward of the control mast 22, but rearward of the lid 28.

As illustrated, the display panel 70 preferably includes a first display 72 for displaying engine rpm and watercraft velocity. In the version illustrated, this display 72 comprises an LED or LCD display which displays the engine rpm in graphical form, and the watercraft velocity in numerical form.

In addition, the display panel 70 includes a second display 74 generally adjacent the first display 72. This second display 74 is preferably capable of displaying, in one or more modes, different information.

As described in part above, and as illustrated in FIG. 1, the lid 28 is arranged so that the top panel 30 thereof extends rearward over the display panel 70. In this configuration, the lid 28 serves as a protective shield for the display panel from the sun and other elements. The shading function of the lid 28 increases the visibility of the display panel 70, which may otherwise be reduced if sunlight impinges directly upon the first and second displays 72,74.

Preferably, although not illustrated, a display control unit is provided for accepting information from various watercraft sensors, such as a watercraft velocity sensor, an engine temperature sensor, a fuel level sensor and others, and for displaying this information on the first and second displays 72,74. In addition, the display control unit is adapted to display information on at least the second display 74 in first and second modes. By way of example, in a first mode, the control unit may be adapted to cause the second display 74 to display the engine temperature and the fuel level, while in a second mode the control unit may be adapted to cause the second display 74 to display oil level and pressure. Of course, it is contemplated that a wide variety of differing information may be displayed in the multiple modes of display, as may now be appreciated by those skilled in the art.

Figure 15:
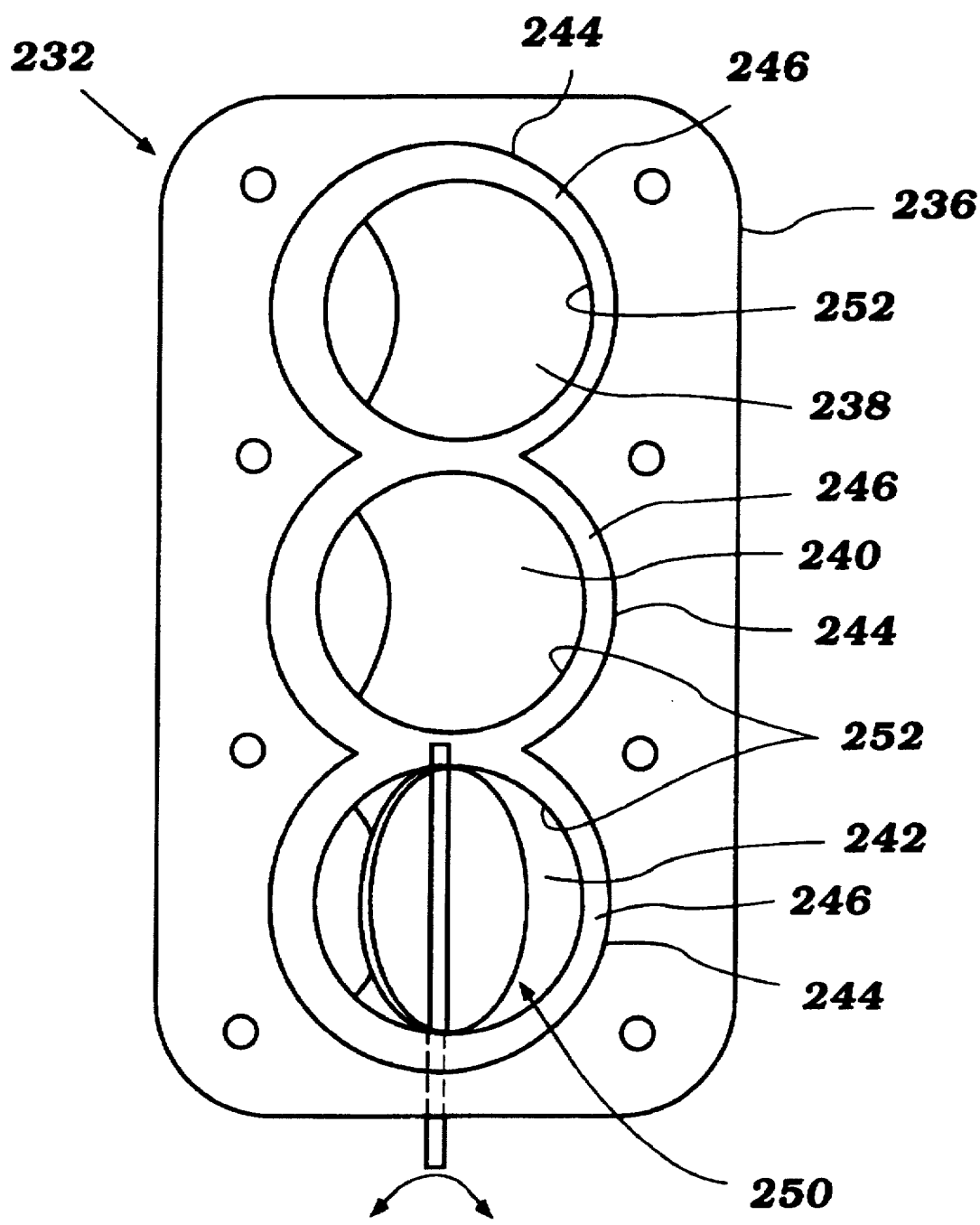
FIG. 15 is a front plan view of a discharge pipe of the watercraft's exhaust system.

As illustrated in FIG. 15, one or more switches 76 are preferably provided on the control panel 70 for use by the user in setting various display features. For example, a switch 76 may be provided allowing the operator to reset a clock or the like. In addition, a display control or mode switch 78 is preferably provided on the display panel 70 for use in controlling the display modes with the display control unit.

As illustrated, the switch 78 is preferably of the sliding type, having first and second positions. Preferably, the switch is adapted to send a first signal to the control unit when in its first position for causing the control unit to display a first set of information or information corresponding to the first display mode. On the other hand, the switch 78 is adapted to send a second signal when in its second position for causing the control unit to display a second set of information or information which corresponds to the second display mode.

In accordance with the present invention, the display arrangement includes means for allowing the operator of the watercraft 10 to switch display modes in a convenient fashion. Preferably, this is accomplished by having means for allowing the operator to switch display modes conveniently positioned near a hand grip 80 of a steering handle 82 extending from the steering mast 22 of the watercraft 10.

Figure 8:
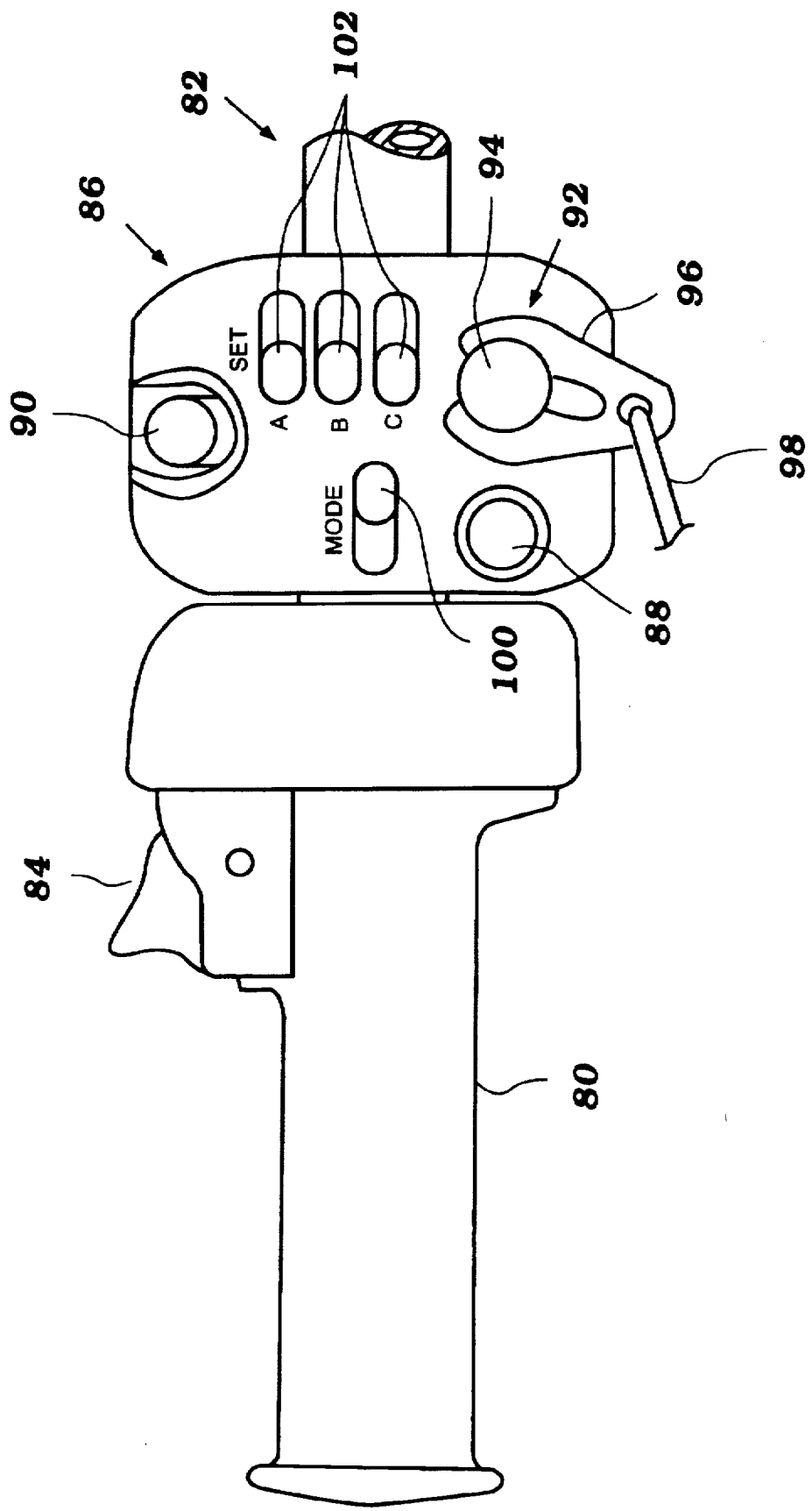
FIG. 8 is an enlarged plan view of a portion of a steering handle of the watercraft illustrated in FIG. 1, and illustrates a grip, throttle control and switch box including a display control switch of the display arrangement.

As best illustrated in FIG. 8, a steering handle 82 extends from the steering mast 22. The steering handle 82 is connected to a steering mechanism (described in more detail below) for use in directing the watercraft 10. As is known to those skilled in the art, the steering handle 82 is generally T-shaped, having a cross-bar with opposing handle portions. Preferably, a grip 80 for gripping by the hand of the watercraft operator is mounted at the end of each opposing handle portion.

Numerous watercraft controls are positioned adjacent at least one of the grips 80 for use by the operator in controlling the watercraft 10. In the embodiment illustrated, a throttle control 84 preferably extends along the outside of the grip 80. A switch box 86 is connected to the handle portion of the steering handle 82 adjacent the grip 80. The box 86 includes a kill switch 88 for use by the user in killing the engine 67 of the watercraft. In addition, a starter switch 90 is provided for activating the starter and starting the engine 67.

A lanyard switch 92 is provided for killing the engine 67 in the event the operator falls from the watercraft or otherwise loses control and can not reach the kill switch 90. As is well known, the lanyard switch 92 preferably includes a pin 94 connected to the switch 92 and a clip 96 connected to the pin 94. A cord 98 has one end connected to the clip 96 and another which has a loop or similar attachment for connection to the operator of the watercraft. In the event the operator falls from the watercraft 10, the cord 98 is stretched, tripping the switch 92 and killing the engine 67.

In accordance with the present invention, a display control or mode switch 100 is also provided on the switch box 86. This mode switch 100 is generally identical to the switch 78 described above which is mounted on the display panel 70, but is mounted adjacent the grip 80 so as to be accessible to the operator when the operator is gripping the grip 80.

In addition, the switch box 86 preferably includes similar switches 102 to the other switches 76 provided on the display panel 70.

While the watercraft 10 has been described as having a mode switch 78 on the display panel 70 and on the switch box 86, it is possible to only include the switch 100 on the switch box 86. The switch 78 on the display panel 70 provides added convenience and may be used when the watercraft 10 is not moving and the operator is not gripping the grips 80.

While the mode switch 100 has been described as mounted to a switch box 86 on the steering handle 82, the mode switch 100 may be independently mounted. In addition, the mode switch 100 may be mounted in or over the grip 80, much like the throttle control 84. Regardless of the mounting, it is desired that the mode switch 100 be accessible by the operator when gripping the grip 80. Most preferably, the mode switch 100 is arranged to be accessible by the thumb of an operator while the operator grips the grip 80 with his fingers.

In the preferred arrangement, the mode switch 100 is positioned so as to be generally opposite the throttle control 84, allowing the operator to easily manipulate the throttle control 84 and the mode switch 100 at the same time. Thus, as illustrated in FIG. 16, the mode switch 100 is positioned on a side corresponding to the grip 80 which is generally opposite the side of the grip on which the throttle control 84 is positioned (i.e. so that the mode switch 100 and throttle control 84 are generally positioned fore and aft of one of the grips 80).

With reference back to FIGS. 1 and 2, the rider's area 24 lies behind the control mast 22 and includes a seat assembly 104. In the illustrated embodiment, the seat assembly 104 has a longitudinally extending straddle-type shape that may be straddled by an operator and by at least one or two passengers. The seat assembly 104, at least in principal part, is formed by a split seat cushion supported by a raised pedestal 106. The split seat cushion includes a rear seat section 108 and a front seat section 110. The raised pedestal 106 has an elongated shape and extends longitudinally along the center of the watercraft 10. The seat cushion sections 108, 110 desirably are removably attached to a top surface of the pedestal 106 and cover the entire upper end of the pedestal 106 for rider and passenger comfort. In the illustrated embodiment, the front seat section 110 overlaps the rear seat section along the split line 112 such that the front end of the rear seat section 108 covers the latch mechanism for the front seat section 110. The rear seat section 108 consequently must be removed first before the front seat section 110 can be removed.

An access opening 114 is located on an upper surface of the pedestal 106 near the control mast 22. The access opening 114 opens into an engine compartment 116 formed within the hull 14. The front seat cushion 110 normally covers and seals closed the access opening 114. When the front seat cushion section 110 is removed, the engine compartment 116 is accessible through the access opening 114.

Figure 9:
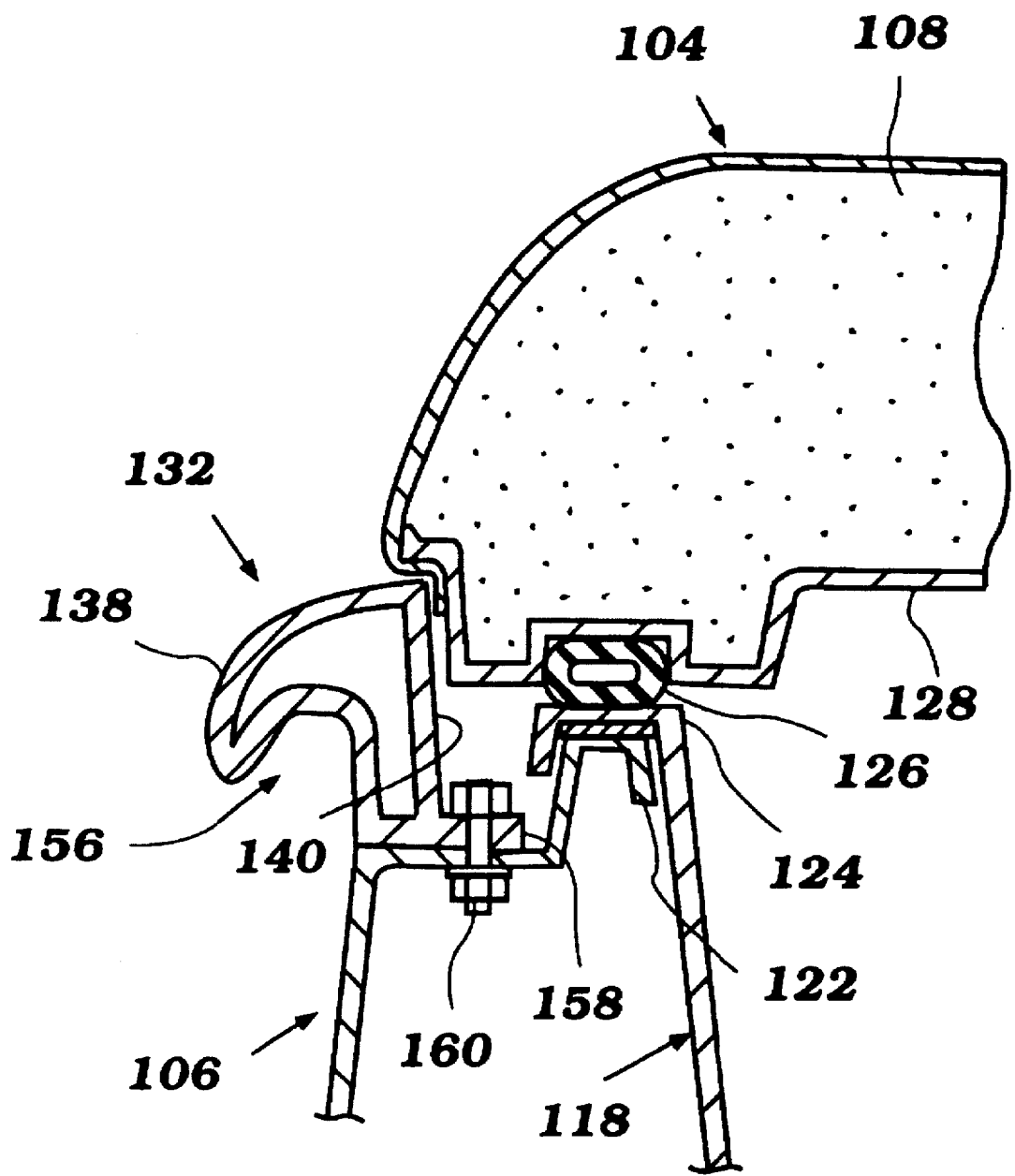
FIG. 9 is a partial cross-sectional view of a portion of the seat assembly of the watercraft illustrated in FIG. 1.

A removable storage box 118 is located behind the access opening 114 and beneath the rear seat section 108. For this purpose, a second opening 120 is formed in the upper surface of the pedestal 106 behind the access opening 114. The second opening 120 is sized to receive a body of the rear storage box 118. As best seen in FIG. 9, the upper surface of the pedestal 106 includes a raised lip 122 that extends about second opening 120.

A corresponding flange 124 extends about the upper end of the storage box 118 and is sized to rest atop and cooperate with the raised lip 122 of the pedestal upper surface. The rear seat cushion 108 sits atop the flange 124 and the raised lip 122 when assembled. In this position, the storage box 118 depends into the hull 14. A seal 126 desirably is compressed between a lower surface 128 of the rear seat section 108 and the flange 124 of the storage box 118 in order to inhibit water from entering the storage box 118.

The pedestal 106 also desirably includes at least one air duct 130 (FIG. 2) located behind the access opening 114. The air duct 130 communicates with the atmosphere through a space between the pedestal 106 and the rear seat cushion 108 in the manner describe below. Air can pass through the rear duct 130 in both directions.

Figure 10:
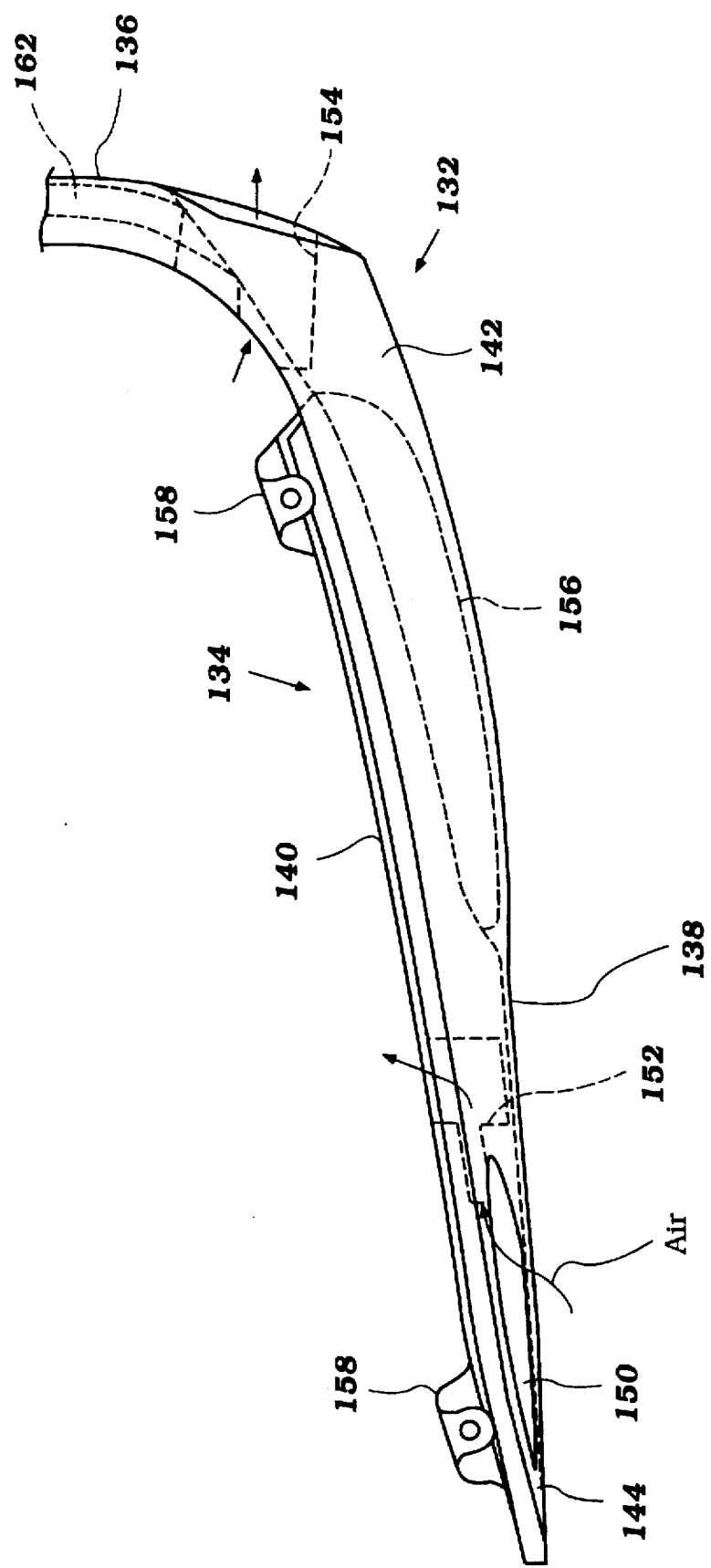
FIG. 10 is a top plan view of one half of a grab bar of the watercraft illustrated in FIG. 1.
Figure 11:
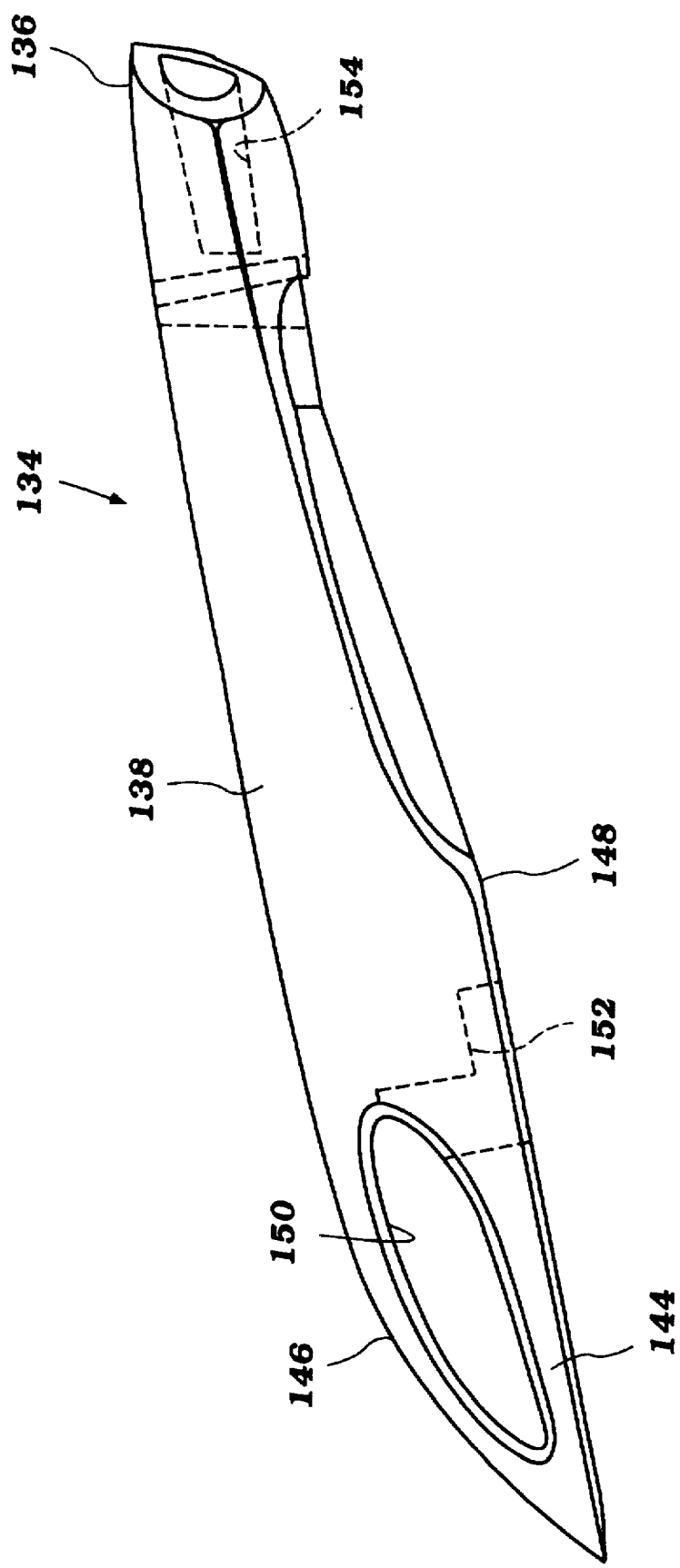
FIG. 11 is a side view of the portion of the grab bar illustrated in FIG. 10.

A grab bar 132 extends about the rear end of the seat assembly 104 in a position that allows passengers to hold the bar 132 when riding. As best seen in FIGS. 2 and 10, the grab bar 132 generally has a U shape formed by a pair of side arms 134 and a rear base member 136. FIGS. 10 and 11 best illustrate an exemplary arm 134 of the grab bar 132. The arms 134 are mirror images of each other and thus the following description of one will be understood as applying equally to both.

As viewed from the top, as seen in FIG. 10, each side arm 132 has a thickness defined between an outer side 138 and an inner side 140. The thickness tapers from an aft end 142 near the base member to a fore end 144. Both side surfaces 138, 140 curve outwardly from the base 136 toward the fore end 144.

As viewed from the side, as seen in FIG. 11, an upper edge 146 of the arm slopes downward toward a lower edge 148 at the fore end 144 of the arm 134. Behind the fore end 144, the arm 132 has a gradually tapering height (as defined between the upper and lower edges 146, 148) that smoothly blends into the base member 136. The outer surface 138 has a curve shape that extends outward from the upper edge 146 to the lower edge 148. The inner surface 140 is generally straight between its upper and lower edges 146, 148.

An air scoop 150 is formed at the fore end 144 of the arm 134. In the illustrated embodiment, the air scoop 150 takes the form of an oval shaped depression. Other shape of course, are also possible.

An influent air passage 152 is formed within the arm 134. The air passage 152 extends between the air scoop 150 and the inner wall 140. The passage 152 also extends downward and opens near the lower edge 148 of the arm 134.

An effluent air passage 154 is formed within the grab bar 132 generally a transition point between the arm 134 and the base 136. The passage 154 extends between the inner and outer surfaces 138, 140 and opens on a rear side of the base member 136.

The side arm 134 also includes a concave relief 156 located near the base member 136. The relief 156 is sized to give the grab bar 132 an ergonomic feel at this location to allow the passenger to grab onto the bar 132 by cupping his or her hands. The relief 156 is sized and configured to receive the end portions of the passenger's fingers. For this purpose, the relief extends up into the body of the side arm 134, as best seen in FIG. 9.

A plurality of mounting flanges 158 extend from the inner wall 140 of the arm 134 for mounting the grab bar 132 to the upper surface of the pedestal 106. Each mounting flange 158 includes a through hole that receives a fastener 160 for this purpose.

The base member 136 also includes a relief 162 formed on an underside of the base 136. Like the reliefs 156 on the side arms 134, the lower relief 162 on the base member 160 is sized and configured to receive the end portions of the passenger's fingers. For this purpose, the relief 162 extends up into the body of the base 136.

As seen in FIG. 9, fasteners 160 attach a grab bar 132 to the pedestal upper surface with the mounting flanges 158 and a lower surface of the side arms 134 resting atop the upper surface. As assembled, the openings of the influent air passages 152 lie near the upper surface of the pedestal 106 in front of the rear storage box 118. Air thus flows from the openings into the space between the seat cushions 108, 110 and the pedestal upper surface. At least a portion of the air desirably flows into the engine compartment 116 through the rear duct 130. Some air also desirably flows from the rear duct 130, about the raised rim 122 of the upper deck 18 about the second opening 120, and through the effluent passages 154. This flow of air beneath the seat cushions 108, 110 tends to produce an effluent flow of air through the rear duct 130 to ventilate the engine compartment 116.

The upper deck section 18 of the hull 12 advantageously includes a pair of raised gunnels 166 (FIG. 2) positioned on opposite sides of the aft end of the upper deck assembly 18. The raised gunnels 166 define a pair of foot areas 168 that extend generally longitudinally and parallel to the sides of the pedestal 106. In this position, the operator and any passengers sitting on the seat assembly 104 can place their feet in the foot areas 168 with the raised gunnels 166 shielding the feet and lower legs of the riders. A non-slip (e.g., rubber) mat desirably covers the foot areas 168 to provide increased grip and traction for the operator and the passengers.

As illustrated in FIG. 1, the watercraft 10 includes a bow eye 170. As illustrated therein, the bow eye 170 is mounted to the bow 172 of the hull 14.

Figure 12:
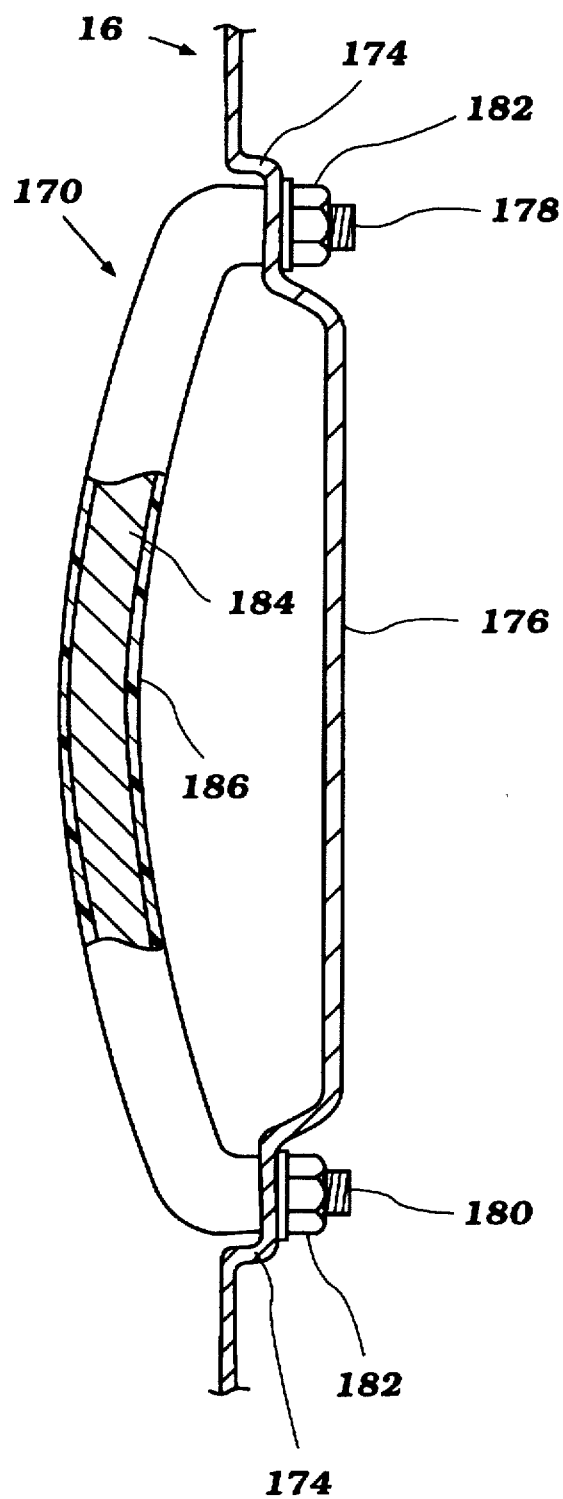
FIG. 12 is an enlarged, partial sectional view of a bow eye of the watercraft illustrated in FIG. 1.

FIG. 12 illustrates the bow eye 170 and its connection to the lower part 16 of the hull 14 in more detail. As illustrated, the hull 14 has a stepped section therein providing a pair of mounting areas 174 and a central recessed section 176.

The eye 170 is generally "U"-shaped, having first and second ends 178, 180. Each end 178, 180 is threaded and extends through one of the mounting areas 174 of the hull 16. Preferably, a washer and a nut 182 are positioned on each end 178, 180 of the eye 170 extending through the hull 16 for connecting the eye 170 to the hull 16.

The eye 170 includes a slightly bowed section spanning the recessed section 176 in the hull 16 between its ends 178, 180. This bowed section, in combination with the recess section 176 defines a space between the hull 16 and eye 170. This allows a hook or other item to be connected to the bow eye 170 for lifting and towing the watercraft 10.

Preferably, the eye 170 has a stainless steel inner core 184 of a generally circular cross-section. In addition, and as illustrated in FIG. 12, a resin coating 186 is preferably provided over at least that portion of the eye 170 which is positioned outside of the hull 16. The resin coating 186 protects the eye 170 from corrosion, and provides an appealing surface appearance which is resistant to scratching.

A similar eye 188 is preferably mounted to the stem of the watercraft 10, as illustrated in FIG. 1. Preferably, this eye 188 is of similar construction and serves generally the same purpose as the bow eye 170.

Figure 13:
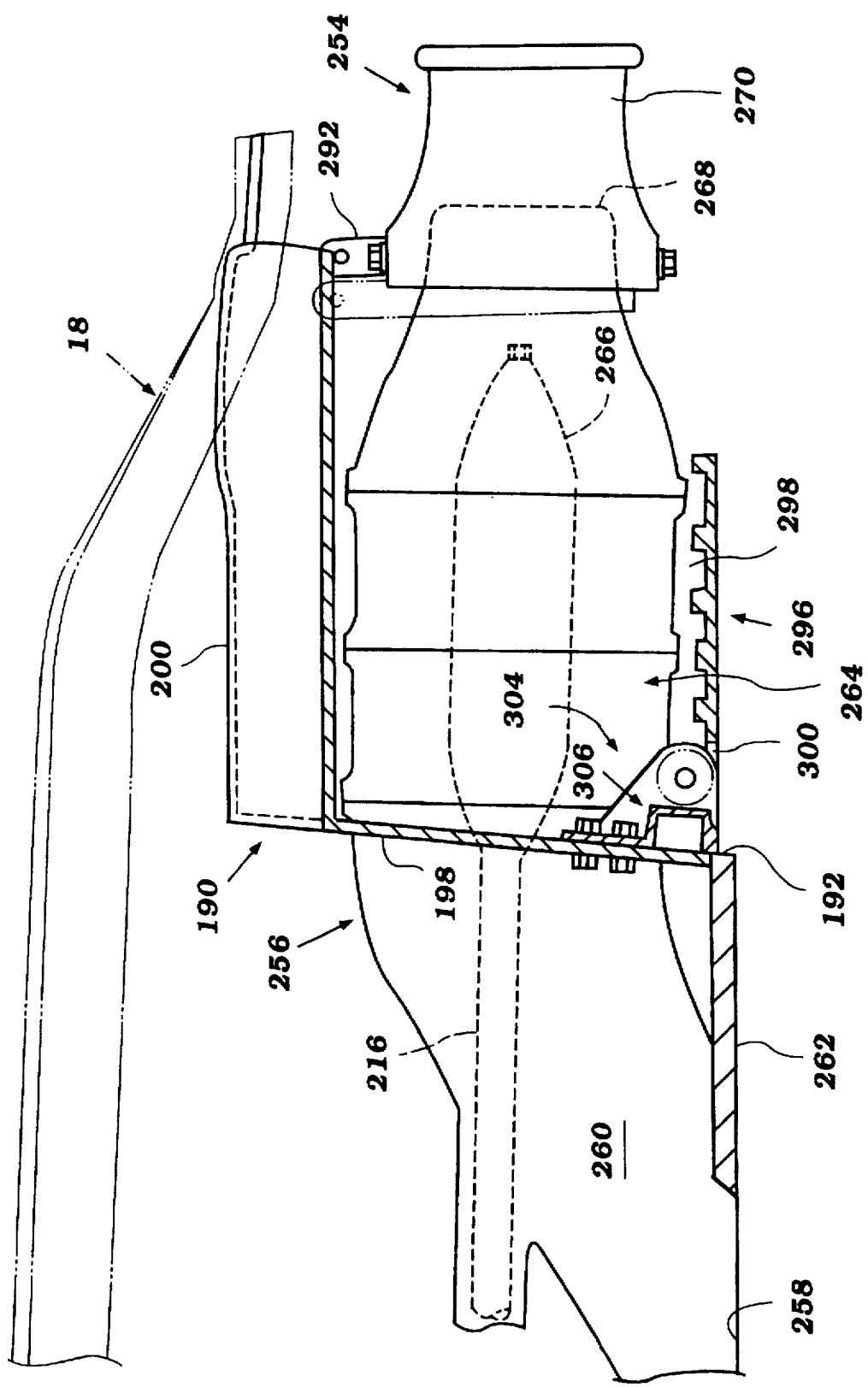
FIG. 13 is a sectional view of an aft end of the watercraft illustrated in FIG. 1.
Figure 14:
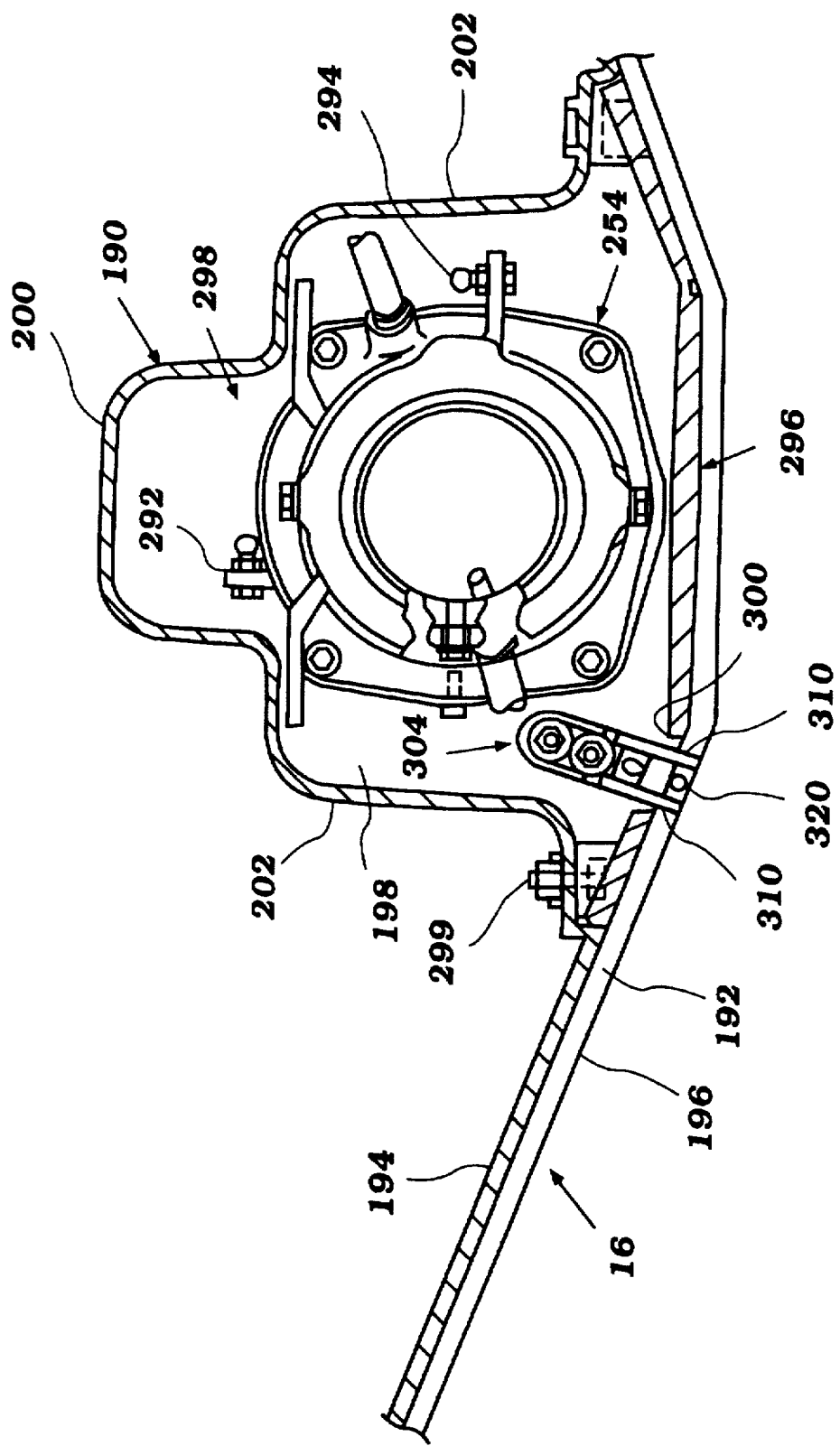
FIG. 14 is a partial cross-sectional view of the watercraft aft end illustrated in FIG. 13 and illustrates an aft tunnel section formed on the underside of the hull.

With reference to FIGS. 1, 13 and 14, the lower hull 16 is designed such that the watercraft 10 planes or rides on a minimum surface area at the aft end of the lower hull 16 in order to optimize the speed and handling of the watercraft 10 when up on plane. For this purpose, the lower hull sections generally has a V-shaped configuration formed by a pair of inclined section that extend outwardly from a keel line of the hull to the hull's side walls at a dead rise angle. The inclined sections also extend longitudinally from the bow toward the transom of the lower hull 14. The side walls are generally flat and straight near the stem of the lower hull and smoothly blend towards the longitudinal center of the watercraft at the bow. The lines of intersection between the inclined section and the corresponding side wall form the outer chines of the lower hull section.

Toward a transom of the watercraft 10, the incline sections of the lower hull 16 extend outwardly from a recessed channel or tunnel that extends upward toward the upper deck portion 16. The tunnel includes a narrow fore section and a wider aft section, generally designated by reference numeral 190. The lower hull 16 also forms a step 192 at the transition between the tunnel sections. As best understood from FIG. 21, the step 192 is formed between lower inclined fore section 194 of the lower hull and the higher aft inclined sections 196 of lower hull 16.

The tunnel fore section generally has a parallelepiped shape that extends through a front wall 198 of the tunnel aft section 190. The tunnel aft section 190 has a tiered shape, as best seen in FIG. 14, which is principally formed by a ceiling portion 200 of the tunnel aft section 190. The aft section 190 in general is formed by the front wall 198, the ceiling 200 and opposing side walls 202. The ceiling 200 includes a stepped relief to give the tunnel the tiered shape in order to accommodate a trim adjustment mechanism, which is described in more detail below. The aft tunnel 190 extends from the front wall 198 and opens through the rear of the transom 191 of the watercraft 10. The front wall 198 includes an opening into the fore section of the tunnel. The lower edges of the front wall 198 and opposing side walls 202 define a lower opening of the aft tunnel 190.

The lower hull portion 16 principally defines the engine compartment 116 in front of a bulkhead 204 (FIG. 1). Except for the air ducts 26, 130, the engine compartment 116 is normally substantially sealed so as to enclose an engine 67 of the watercraft 10 from the body of water in which the watercraft 10 is operated.

The internal combustion engine 67 powers the watercraft 10. The engine 67 is positioned within the engine compartment 116 and is mounted centrally within the hull 14. Vibration-absorbing engine mounts secure the engine 67 to the lower hull portion 16 in a known manner.

In the illustrated embodiment, the engine 67 includes a plurality of in-line cylinders and operates on a two-stroke, crankcase compression principle. The engine 67 is positioned such that the row of cylinders lies parallel to a longitudinal axis of the watercraft 10, running from bow to stern. This engine type, however, is merely exemplary. Those skilled in the art will readily appreciate that the present fuel delivery system can be used with any of a variety of engine types having other numbers of cylinders, having other cylinder arrangements and operating on other combustion principles (e.g., four-stroke principle).

A cylinder block and a cylinder head assembly desirably form the cylinders of the engine. A piston reciprocates within each cylinder of the engine and together the pistons drive an output shaft 206, such as a crankshaft, in a known manner. A connecting rod links the corresponding piston to the crankshaft 206. The corresponding cylinder bore, piston and cylinder head of each cylinder forms a variable-volume chamber, which at a minimum volume defines a combustion chamber.

The crankshaft 206 desirably is journalled with a crankcase, which in the illustrated embodiment is formed between a crankcase member and a lower end of the cylinder block. Individual crankcase chambers of the engine are formed within the crankcase by dividing walls and sealing disks, and are sealed from one another with each crankcase chamber communicating with a dedicated variable-volume chamber. Each crankcase chamber also communicates with a charge former of an induction system through a check valve (e.g., a reed-type valve). The induction system receives fuel from a fuel tank 208, which is positioned within the hull 16, and produces the fuel charge which is delivered to the cylinders in a known manner.

The fuel tank 208 is located within the hull 14 beneath the cover 28. Conventional means, such as, for example, straps, secure the fuel tank 208 to the lower hull 16. A fuel filler hose extends between a fuel cap assembly 210 (FIG. 2) and the fuel tank 208. In the illustrated embodiment, the filler cap assembly is secured to the bow portion 20 of the hull upper deck 18 to the side and in front of the control mast 22. In this manner, the fuel tank can be filled from outside the hull 14 with the fuel passing through the fuel filler hose into the tank 208.

An oil tank 212 is also located forward of the engine 67. A suitable oil delivery system supplies oil from the tank 212 to the engine in a known manner.

Because the internal details of the engine 67, the fuel supply system and the induction system desirably are conventional, a further description of the engine construction is not believed necessary to understand and practice the invention.

As seen in FIG. 1, a coupling 214 interconnects the engine crankshaft 206 to an impeller shaft 216. A bearing assembly, which is secured to the bulkhead 204, supports the impeller shaft 216 behind the shaft coupling 214.

An exhaust system 218 is provided to discharge exhaust byproducts from the engine 67 to the atmosphere and/or to the body of water in which the watercraft 10 is operated. The exhaust system 218 includes an exhaust manifold that is affixed to the side of the cylinder block and which receives exhaust gases from the variable-volume chambers through exhaust ports in a well-known manner.

An outlet end of the exhaust manifold communicates with a C-shaped pipe section 220. This C-pipe 220 includes an inner tube that communicates directly with the discharge end of the exhaust manifold. An outer tube surrounds the inner tube to form a coolant jacket between the inner and outer tubes. Although not illustrated, the C-pipe 220 includes an inlet port positioned near its inlet end. The inlet port communicates with a water jacket of the engine.

The outlet end of the C-pipe 220 communicates with an expansion chamber 222. In the illustrated embodiment, the expansion chamber 222 has a tubular shape in which an expansion volume is defined within an annular, thick wall. Coolant jacket passages extend through the expansion chamber wall and communicate with the coolant jacket of the C-pipe 220.

A flexible coupling connects the outlet end of the C-pipe 220 to the inlet end of the expansion chamber 222. The flexible coupling also can includes an outlet port which communicates with an internal coolant passage within the flexible coupling. The coolant passage places the coolant jacket and the coolant passages in communication.

The outlet end of the expansion chamber 222 is fixed to a reducer pipe 224 which tapers in diameter toward its outlet. The pipe 224 has a dual shell construction formed by an inner shell which defines an exhaust flow passage. The expansion volume communicates with this passage.

An outer shell is connected to the inner shell and defines a cooling jacket about the inner shell of the reducer pipe 224. The coolant jacket passages of the expansion chamber communicate with the coolant jacket of the pipe to discharge a portion of the coolant with the exhaust gases.

A catalytic device can be disposed within the space defined at the mating ends of the expansion chamber 222 and the reducer pipe 224. For instance, the catalytic device can include an annular shell supporting a honeycomb-type catalyst bed. The catalyst bed is formed of a suitable catalytic material such as that designed to treat and render harmless hydrocarbons, carbon monoxide, and oxides of nitrogen. An annular flange supports the annular shell generally at the center of the flow path through the expansion chamber volume. In this manner, all exhaust gas that flows through the expansion chamber passes through the catalyst bed. The expansion chamber 222 and between outlet end of the expansion chamber 222 and the inlet end of the reducer pipe 224.

The lower section of the reducer pipe 224 includes a downward turned portion that terminates at the discharge end. The inner shell stops short of the outer shell such that the water flow through the water jacket merges with the exhaust gas flow through the exhaust passage at the discharge end.

A flexible pipe 226 is connected to the discharge end of the reducer pipe 224 and extends rearward along one side of the watercraft hull tunnel. The flexible conduit 226 connects to an inlet section of a water trap device 228. The water trap device 228 also lies within the watercraft hull 14 on the same side of the tunnel.

The water trap device 228 has a sufficient volume to retain water and to preclude the back flow of water to the expansion chamber 222 and the engine 67. Internal baffles within the water trap device 228 help control water flow through the exhaust system 218.

An exhaust pipe 230 extends from an outlet section of the water trap device 228 and wraps over the top of the tunnel aft section 190 to a discharge pipe 232.

FIGS. 15–19 illustrate the exhaust discharge pipe 232 for the watercraft 10. As described in detail above, exhaust is routed from the engine 67 through the exhaust system to the exhaust pipe 230. This exhaust pipe 230 is connected to a body 234 of the pipe 232 which is mounted at the stern of the watercraft 10. The body 234 is adapted to route the exhaust from the exhaust pipe to a point exterior to the watercraft 10 at the stern thereof.

As illustrated, the discharge body 234 has a generally tubular section which mates to the exhaust pipe 230. At the opposite end of the body 234 is a mounting plate 236. In between the plate 236 and the tubular section of the body 234, the body 234 has a section of increased width as compared to the tubular section.

A flow path is provided through the body 234 from its end connected to the exhaust pipe 230 through the plate 236. In particular, a passage is provided in the tubular section of the body 234 which leads into a chamber in the wider section of the body. Then, as illustrated in FIG. 16, there are first, second and third passages 238, 240, 242 leading from this chamber through the plate 236. Each of the first, second and third passages 238, 240, 242 are preferably elliptical or oval in shape.

Figure 19:
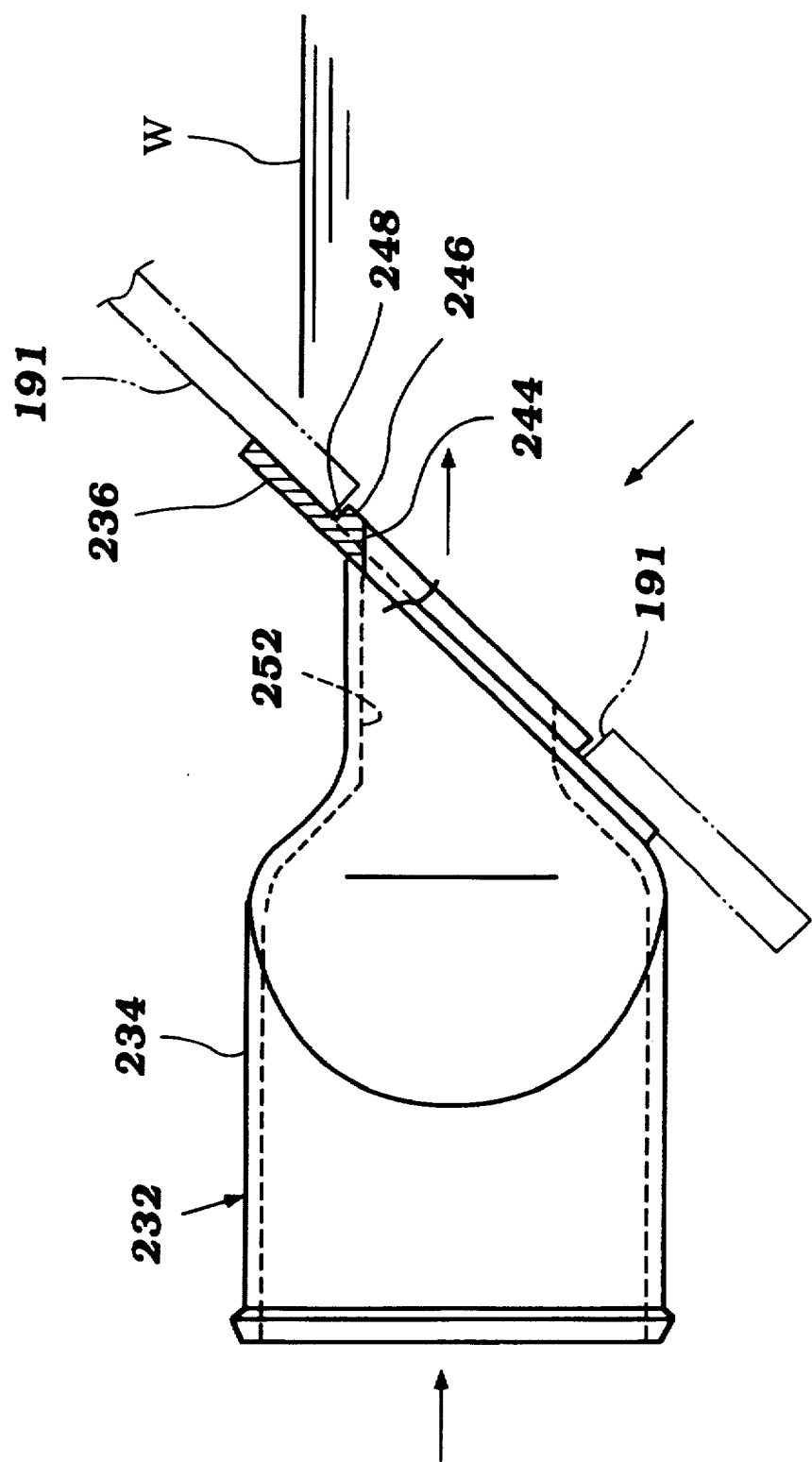
FIG. 19 is a side view of the discharge pipe illustrated in FIG. 15 shown mounted on a transom of the watercraft.

Preferably, and as best illustrated in FIG. 19, the plate 236 is oriented at an acute angle with respect to the remainder of the body 234. This facilitates mounting of the plate 234 to the inside surface of the transom portion 191 of the hull 16 of the watercraft 10, which is similarly angled. An outwardly extending, generally oval or elliptical flange 244 extends from the plate 236 around where each passage 238, 240, 242 extends through the plate 236. Each flange 244 has an outer surface 244 which faces in a direction generally opposite the remainder of the body 234 positioned on the opposite side of the plate 236. In addition, each flange 244 has a peripheral edge 248 which is adapted to mate with a corresponding portion of the transom 191, thereby providing a snug fit between the flanges 244 and the transom wall, preventing entry of water between the plate and transom.

As illustrated in FIG. 15 (but not illustrated in the other figures, for simplicity of the drawings), a valve plate 250 is provided in one of the passages 242. As illustrated, the plate 250 is of the butterfly variety. So that at least that passage 242 in which the plate 250 is mounted is well defined, a dividing wall 252 extends into the chamber within the body from the plate 236.

The plate 250 is rotatably mounted to the body 234 via a shaft or similar mounting. Generally, the plate 250 is movable between a position in which it obscures a majority of the passage 242, and a position in which it only partially obscures or obscures very little of the passage 242.

The position of the plate 250 is preferably controlled by an electric motor or similar actuator which is controlled by an ECU of the watercraft 10 employing a specific control strategy. For example, the ECU may control the plate 250 so that the plate 250 obscures the passage 242 when the watercraft 10 is at a low speed and has not planed. As illustrated in FIG. 19, when the watercraft 10 is in this position, the exhaust discharge is positioned under water. When the plate 250 is closed, the exhaust gas pressure through the other two passages 238,240 increases, serving to prevent water from flowing into the discharge into the exhaust system. On the other hand, when the watercraft 10 has planed or the engine speed is in the intermediate or high range, the ECU may instruct the plate 250 to move into a position in which the passage 242 is generally not obscured, lessening the exhaust gas back pressure and improving engine efficiency.

It is contemplated that more than one of the passages 238, 240, 242 include a flow control plate. In addition, it is noted that it is possible to provide the exhaust gas discharge with more or less than three passages.

Notably, the elliptical or oval shape of the passages 238, 240, 242 is advantageous since the height of each exhaust passage 238, 240, 242 is short, thereby maintaining the exhaust passage under a waterline W (see FIG. 19) more than if the passages were taller (such as would be the case if the passages were circular). At the same time, the total flow area through each passage 238, 240, 242 remains high to reduce back pressure.

In addition, it is noted that this particular discharge arrangement provides cost savings in manufacture and assembly of the watercraft over prior art arrangements. In particular, the discharge is simply installed in the transom 191 of the watercraft 10 which is readily accessible at the stem of the watercraft. This is in contrast with other discharge arrangements, such as that where the exhaust pipe leads to the propulsion passage, which is a difficult connection to manufacture and assemble.

Figure 21:
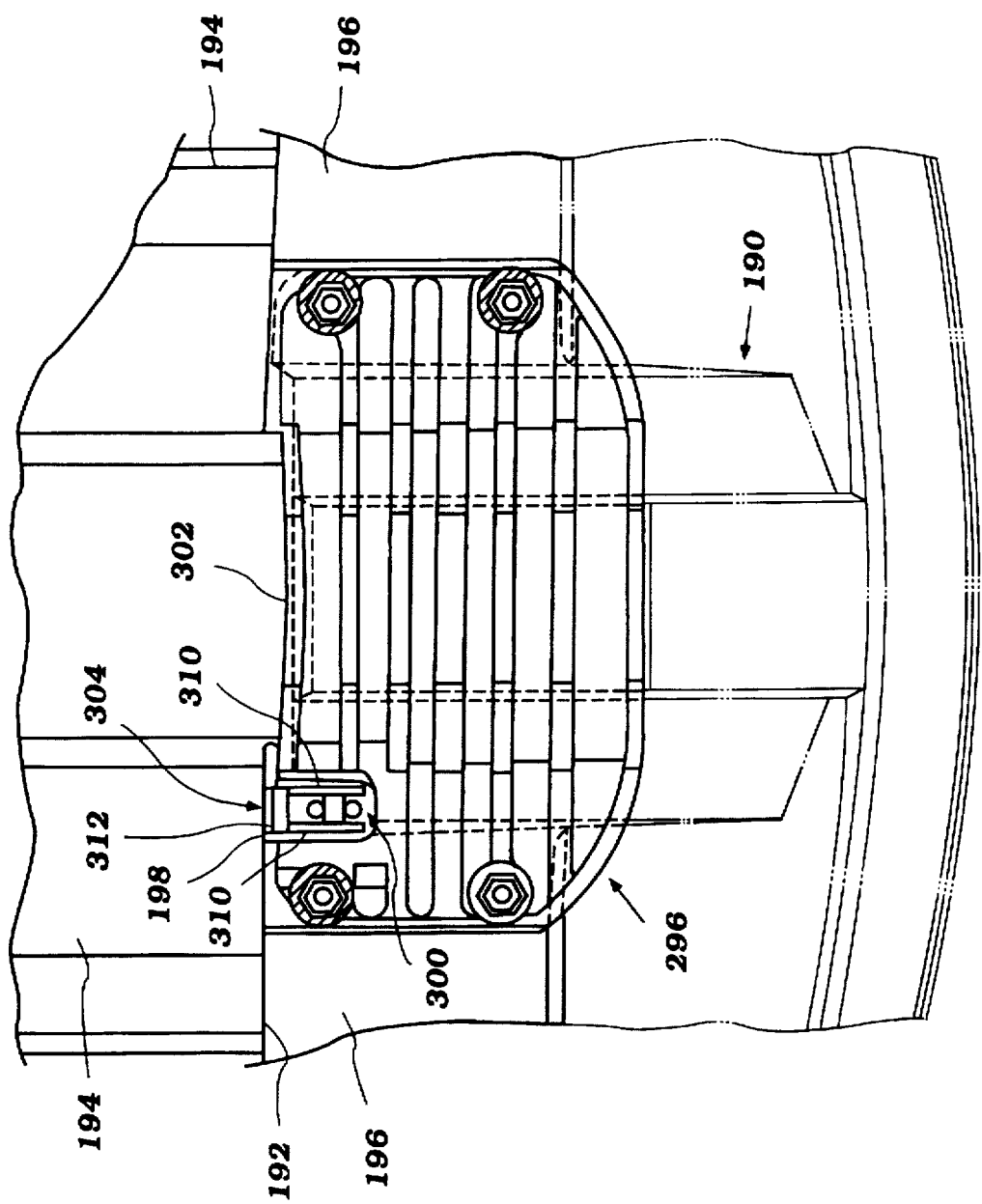
FIG. 21 is a bottom plan view of the aft end of the watercraft shown in FIG. 13.
Figure 22:
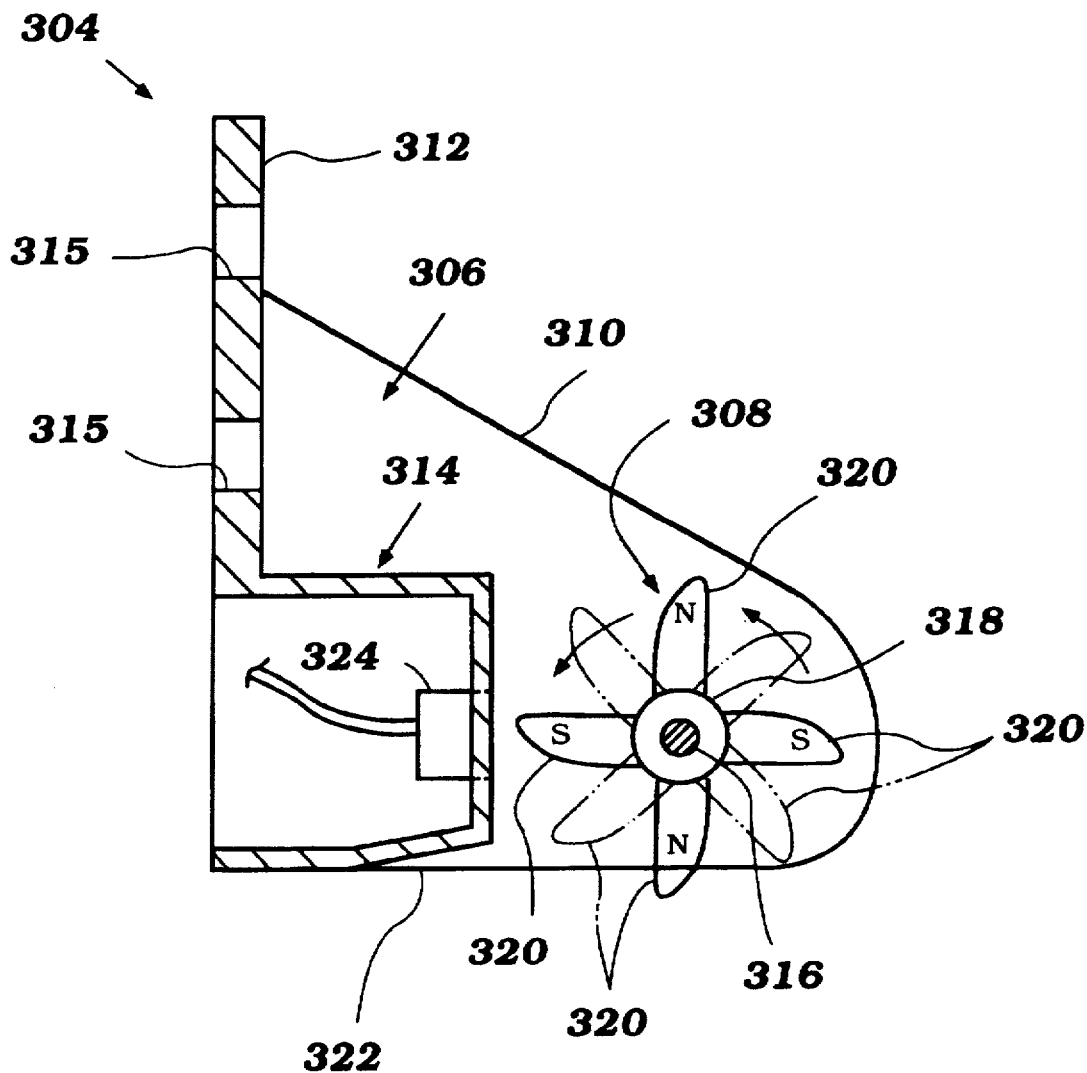
FIG. 22 is a cross-sectional view of a speed sensor configured in accordance with a preferred embodiment of the present invention.
Figure 23:
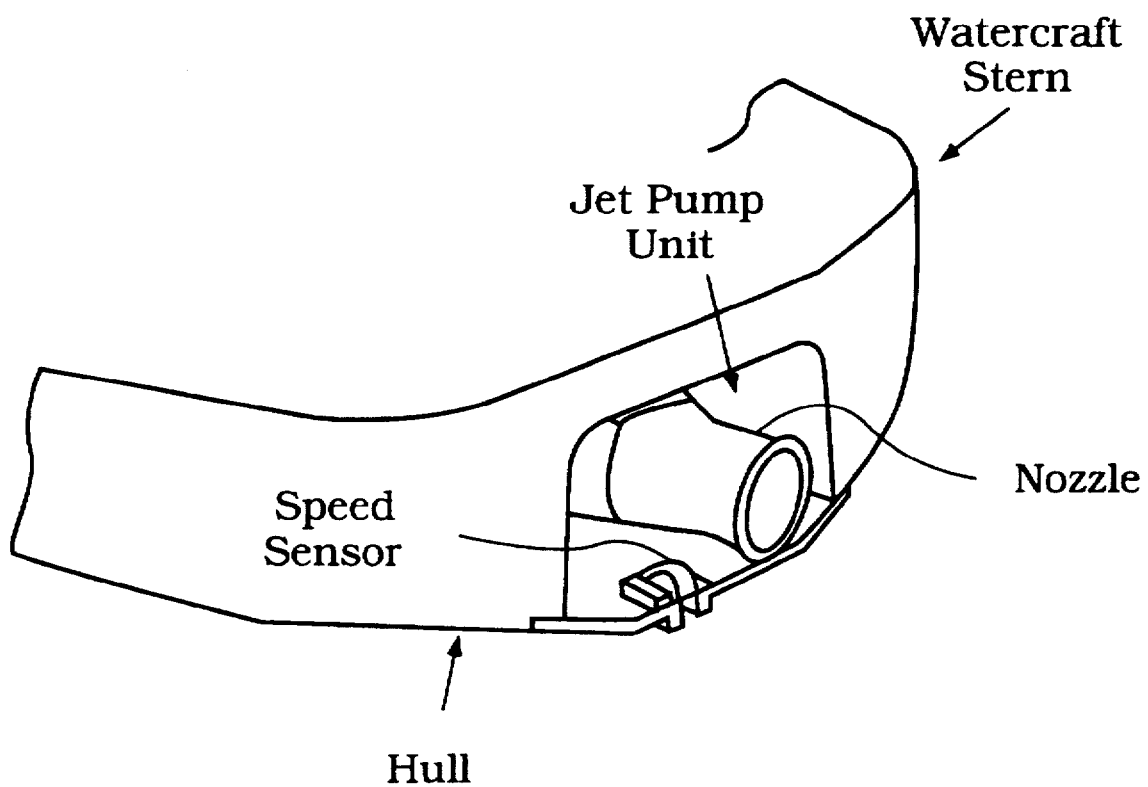
FIG. 23 schematically illustrates a prior arrangement of a speed indicator positioned at the stem of a personal watercraft, near the discharge nozzle.

The impeller shaft 216 drives a propulsion device 254 of the watercraft. In the illustrated embodiment, a jet pump unit 254 propels the watercraft 10. A portion of the jet pump unit 254 is mounted within the aft tunnel 190 formed on the underside of the lower hull section 16 by a plurality of bolts. An intake duct 256 of the jet pump unit 254 extends through the opening on the front wall 198 of the tunnel and extends into the fore section of the tunnel. The intake duct 256 at its front lower end defines an inlet opening 258 that opens into a gullet 260 of the intake. A lower flange plate 262 extends about the intake duct and mates with the corresponding inclined fore sections 194 and the tunnel front wall 198 to generally enclose the tunnel fore section. As best seen in FIG. 13 and 21, the flange plate 262 thus forms a portion of the step 192 between the fore and rear sections 194, 196 of the lower hull 16.

The gullet 260 of the intake duct 256 leads to an impeller housing assembly 264 in which an impeller 266 of the jet pump 254 operates. An impeller housing assembly also acts as a pressurization chamber and delivers the water flow from the impeller housing 264 to a discharge nozzle housing 268. The impeller housing and the pressurization chamber 264 are located within the larger aft section 190 of the tunnel.

The impeller shaft 216 supports the impeller 266 within the impeller housing 264 of the unit 254. The aft end of the impeller shaft 216 is suitably supported and journalled within the compression chamber of the assembly 264 in a known manner. The impeller shaft 216 extends in the forward direction through the bulkhead 204 of the tunnel.

Figure 20:
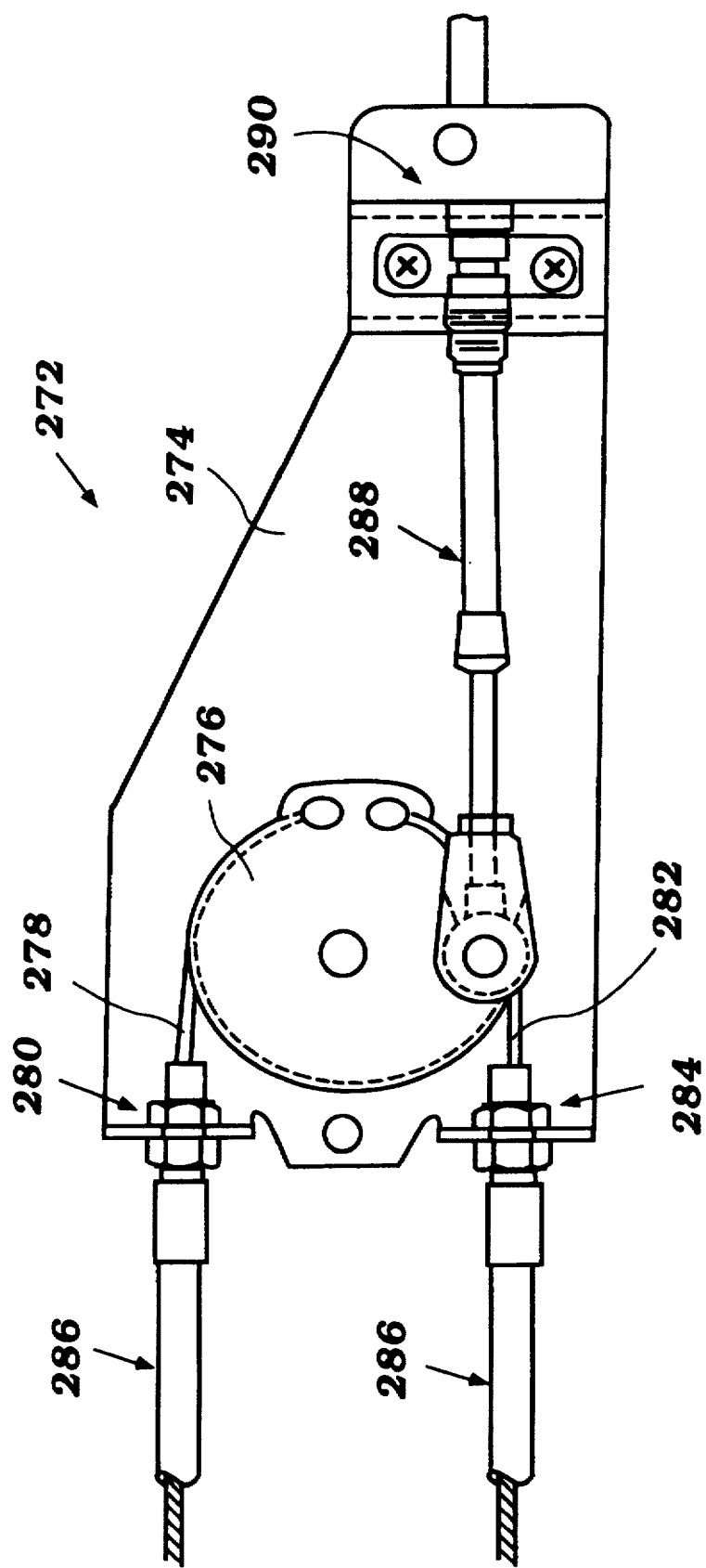
FIG. 20 is an elevational view of a trim shift actuator assembly used in a trim adjustment system of the watercraft illustrated in FIG. 1.

A steering nozzle 270 is supported at the downstream end of the discharge nozzle 268 for effecting directional changes of the watercraft 10. FIGS. 13–14 and 20 illustrate the arrangement by which the nozzle 270 position may be controlled, thereby steering the watercraft 10 and changing its trim angle.

FIG. 20 illustrates a trim control linkage 272 for the watercraft 10 of the present invention. The trim control linkage 272 includes a mounting plate 274 which is connected to the upper deck 18 of the watercraft 10, preferably below the front seat 110 (see FIG. 1). A disc 276 is rotatably mounted to the plate 274. A first cable 278 is connected to a peripheral edge of the disc 276 and extends along the edge of the disc to its top, thence the cable 278 extends from the disc 276 through a guide 280 connected to the plate 274. Similarly, a second cable 282 is connected to the edge of the disc 276 generally adjacent the first cable 278. The second cable 282 extends, however, around the edge of the disc 276 to its bottom, and on through a guide 284 positioned in the plate 274 below the top guide 280.

The first cable 278 preferably extends to a trim lever (not shown) which is positioned within reach of the operator when the operator is operating the watercraft. Similarly, the second cable 282 extends to the trim lever. The trim lever and the connection of the cables 278,282 is such that when the lever is moved in one direction, the disc 276 rotates in a first direction, and when the lever is moved in another direction, the disc 276 rotates in a second direction. While there are a variety of arrangements by which this may be accomplished, one simple design is for the trim lever to be rotatably connected to the hull 16 of the watercraft about an axis, and for the first cable 278 to be connected to the lever above this axis and the second cable 282 connected to the lever below this axis.

As illustrated in FIG. 20, after extending through its respective guide 280, 284 each cable may extend through a protective sheath 286. The sheath 286 protects the cable, and causes the cable to have a Bowden wire arrangement, whereby each cable 278, 282 transmits force in tension and compression. Of course, the cables 278, 282 may be replaced with more rigid shafts or links, if desirable, but this may undesirably increase the weight of the watercraft 10.

As also illustrated in FIG. 20, a linkage or link member 288 extends from the disc 276 in the direction opposite the cables 278, 282. The linkage 288 is preferably a Bowden wire which has its first end connected to the disc near its outer periphery and at a point such that it is generally aligned with one of the cables 278, 282. The linkage 288 extends from the disc 276 through a guide 290 at the end of the plate 274 opposite the cable guides 280, 284. The second end of the linkage 288 is connected to a mounting bracket 292 extending from a top edge of the nozzle 270, as illustrated in FIGS. 13 and 14.

As illustrated in FIGS. 13 and 14, the nozzle 270 is rotatably mounted to the watercraft 10 about a generally horizontal axis via at least one pin (not shown). In this manner, movement of the linkage 288 causes the nozzle 270 to move along a vertical axis and about the pin. In particular, when the operator moves the trim lever, the disc 276 rotates, pulling or pushing the linkage 288 depending on the direction the operator has moved the lever, thereby pushing the nozzle 270 down or pulling it up. When the nozzle 270 is directed downward, the nozzle directs propelled water downward, thus directing the watercraft 10 slightly upwardly out of the water as well as forward, thereby speeding the planing of the watercraft, as is well known to those skilled in the art. The nozzle 270 may then be adjusted back to its normal position after the watercraft has planed (see FIG. 13, which illustrates two positions of the bracket 292 when the linkage 288 is moved).

As described in more detail above, the watercraft 10 also includes a steering handle 82 for use by the operator in steering the watercraft 10. Though not illustrated in detail herein, the steering handle 82 is connected via a linkage to the nozzle 270 for effectuating movement of the nozzle from side-to-side in a horizontal plane. As generally illustrated in FIG. 14, this steering linkage may be connected to the side of the nozzle 270 at a linkage connector 294.

As described above, the nozzle 270 is mounted for movement in a vertical plane about at least one pin in the horizontal axis. In addition, however, the nozzle 270 must be simultaneously mounted so as to move with respect to that pin in the horizontal axis. This may be accomplished by positioning the pin in a mounting slot provided in the nozzle, or via another similar mounting know to those skilled in the art.

As best seen in FIGS. 13, 14 and 21, a ride plate 296 substantially covers the aft section 190 of the tunnel behind the inlet opening 258 to enclose the pump assembly 264 and the nozzle assembly 268 of the propulsion unit 254 within a pump chamber 298. In this manner, the lower opening of the tunnel aft section 190 is closed to provide a planing surface for the watercraft 10. Bolts 299 secure the ride plate 296 to the lower hull 16 with the ride plate 296 blending with the rear incline sections 194 of the hull 16.

The ride plate 296 includes an aperture 300 formed near its front edge 302, proximate to the front wall 198 of the tunnel aft section 190. In the illustrated embodiment, the aperture 300 is a slot that extends into the ride plate from the front edge 302; it is understood, however, that the aperture 300 can be a hole (of any shape) defined entirely within the boundary of the ride plate's periphery. For example, the aperture can be a rectangular shaped hole formed adjacent to and just behind the leading edge 302 such that a portion of the ride plate 296 lies between the leading edge and the aperture.

With reference to FIGS. 13, 14, 21 and 22, a speed sensor 304 is used to determine the speed of the watercraft 10. The speed sensor 304 communicates with the display controller (and possibly an intermediate processor) to display the sensed speed on the visual display 70. The speed sensor 304 includes a housing 306 that houses a paddle wheel 308. The housing 306 includes a pair of side lugs 310 that extend from a base plate 312. An enclosure 314 also extends outward from the base plate 312 at a position between the lugs 310. The enclosure 314 is open on the opposite side of the base plate 312. The base plate 312 also includes a plurality of through holes 315 located above the enclosure 314.

A shaft 316 extends between and is supported by the lugs 310. The shaft 316 desirably lies generally parallel to the base plate 312 and is positioned toward the outer ends of the lugs 310 directly behind the enclosure 314. In the illustrated embodiment, the shaft 316 is fixed to the lugs 310, however, the shaft 316 can be suitably journalled to permit rotation of the shaft 316 relative to the lugs 310.

The shaft 310 supports the paddle wheel 308 at a location between the lugs 310. The paddle wheel 308 desirably is suitably journalled to rotate about the shaft 316. For this purpose, the paddle wheel includes a bushing hub 318 that rotates on the shaft 316. The hub 318, however, is desirably maintained in a generally constant axial position on the shaft 316 by known means.

A plurality of blades 320 radiate from the hub 318. Each blade 320 is sized such that the tip of the blade 320 extends slightly below the lower edge 322 of the housing 306, i.e., no more than 25% of the total blade length as measured from base to tip extends below the housing lower edge 322, and preferably not more that 20%. Each blade 320 also is configured principally for rotation in a water flow moving from the base 312 toward the paddle wheel 308.

The speed sensor 304 also includes a rotation detector that is used to determine the rotational speed of the paddle wheel 308. In the illustrated embodiment, the rotational detector includes a Hall-effect transducer 324 that cooperates with the blades 320 of the paddle wheel 308. For this purpose, the blades 320 of the paddle wheel 308 desirably are made of a magnetic material and are alternately polarized. The paddle wheel 308 therefore includes an even number of blades 320. The exemplary embodiment shown in FIG. 22 includes four blades 320 with the blades that are position on diametrically opposite sides of the hub having the same polarity (schematically illustrated by the N and S corresponding to magnetic poles).

The Hall-effect transducer 324 is enclosed between the enclosure 314 and the front wall 198 when the sensor 304 is mounted on the front wall 198. A plurality of fasteners secure the sensor 304 at this location.

The transducer 324 produces a signal which can then be used to determine the speed of the watercraft 10. The signal is communicated to either the visual controller or to an intermediate processor via conventional means.

The speed sensor 304 is mounted to the front wall 198 of the tunnel 190 and desirably lies to a side of the jet pump unit 254 opposite of the steering lever 294 and associated cables. In this position, as best seen in FIGS. 13, 14 and 21, at least a portion of the lower end of the housing 306 that includes the paddle wheel 308 fits within the aperture 300 formed in the ride plate 296. In this position, the tip of the blades 320 extend slightly below the ride plate 296 off to one side of the jet pump unit 256 and well behind the transom 191. The speed sensor 304 is not readily seen from the rear side of the watercraft 10 and does not interfere with the operation or arrangement of the steering and trim adjustment mechanisms in this position. The signal wires from the Hall-effect transducer 324 are also easily routed through the front wall 198 to the watercraft control electronics. In addition, the speed sensor 302 lies directly behind the step 192 formed on the underside of the hull 16 which helps to protect the speed sensor 304. The position of the speed sensor 304 on the front wall 198 of the tunnel 190 thus simplifies the arrangement of the speed sensor 304 as well as affords additional protection for the speed sensor 304.

With reference back to FIG. 1, the propulsion unit 254 supplies cooling water through a conduit to an engine cooling jacket. For this purpose, an outlet port is formed on the housing of the pressurization chamber assembly of the jet pump 254. The conduit is coupled to the outlet port and extends to an inlet port to the engine water jacket. In the illustrated embodiment, the inlet port desirably lies at the lower rear end of the engine 67, either on the cylinder block or on an exhaust manifold of the engine which is attached to the cylinder block.

The engine cooling jacket extends through the exhaust manifold, through the cylinder block, about the cylinders, and through the cylinder head assembly. Either the cylinder head assembly or the exhaust manifold can include a coolant discharge port through which the cooling water exits the engine and thence flows through at least a portion of the exhaust system. In the illustrated embodiment, the discharge port is formed in the cylinder head assembly. A conduit connects the discharge port to the exhaust system. The cooling water thence flows through the water jacket of the exhaust system 218 in the manner described above.

As apparent from the above description, the arrangement of a speed sensor on a personal watercraft better shields the sensor while simplifying the layout and arrangement of the sensor on the underside of the watercraft hull. As attached to the front wall of the tunnel aft section, the speed sensor does not interfere with the arrangement or operation of the steering or trim adjustment mechanisms used with a jet propulsion. The speed sensor also is generally protected in this location and is not visible from the rear of the watercraft to improve the watercraft's aesthetics.

Although this invention has been described in terms of a certain preferred embodiment, other embodiments apparent to those of ordinary skill in the art are also within the scope of this invention. Accordingly, the scope of the invention is intended to be defined only by the claims that follow.

What is claimed is:

1. A watercraft comprising a hull defining a pump chamber formed on an underside of the hull, the pump chamber extending from a front wall and terminating at an aft opening, a jet propulsion unit positioned at least partially within the pump chamber, the jet propulsion unit having a discharge nozzle positioned near the aft opening to discharge water to propel the watercraft, a ride plate attached to the underside of the hull and sized to at least partially close an underside of the pump chamber, said ride plate including an aperture that lies near the front wall, and a speed sensor mounted to the front wall of the pump chamber with a portion of the speed sensor being exposed through the aperture.

2. A watercraft as in claim 1, wherein the speed sensor includes a paddle wheel having a plurality of blades and a rotation detector cooperating with the paddle wheel to detect rotation of the paddle wheel.

3. A watercraft as in claim 2, wherein the paddle wheel includes at least two blades of opposite magnetic polarity and the detector is a Hall-effect element that is influenced by the polarity of the blades.

4. A watercraft as in claim 3, wherein the Hall-effect element is substantially sealed within a cavity formed between the housing and the front wall.

5. A watercraft as in claim 2, wherein the paddle is positioned within a housing of the speed sensor to expose only a tip of one blade at a time beneath an underside surface of the ride plate.

6. A watercraft as in claim 5, wherein the paddle wheel is arranged within the housing to rotate about an axis that is generally parallel to a plane defined by the underside surface of the ride plate.

7. A watercraft as in claim 1, wherein the ride plate fits about a housing of the speed sensor.

8. A watercraft as in claim 1, wherein the discharge nozzle of the jet propulsion unit is movable by a cable connected to a lever on the discharge nozzle, with the lever and the cable being positioned on one side of the jet propulsion unit, and the speed sensor is located on an opposite side of the jet propulsion unit.

9. A watercraft as in claim 8, wherein the lever is arranged on the discharge nozzle to rotate the discharge nozzle about a generally vertical axis for steering of the watercraft.

10. A watercraft as claim 1, wherein the speed sensor is positioned behind a step formed on the underside the hull.

11. A watercraft as in claim 1, wherein the aperture is a slot formed on the front edge of the ride plate.

12. A watercraft comprising a hull defining a pump chamber formed on an underside of the hull, a jet propulsion unit positioned at least partially within the pump chamber, the jet propulsion unit desirably arranged within the pump chamber to lie about a longitudinal axis, and a speed sensor mounted to the hull at a position offset to one side of a vertical plane that contains the longitudinal axis, at least a portion of the speed sensor extending beneath a ride plate that covers at least a portion of an underside of the pump chamber.

13. A watercraft as in claim 12, wherein the speed sensor includes a paddle wheel having a plurality of blades and a rotation detector cooperating with the paddle wheel to detect rotation of the paddle wheel.

14. A watercraft as in claim 12, wherein the speed sensor is positioned behind a step formed on the underside of the hull.

15. A watercraft as in claim 12, wherein the jet propulsion unit includes a discharge nozzle that is movable by a cable connected to a lever on the discharge nozzle, the lever and the cable are positioned on one side of the jet propulsion unit, and the speed sensor is located on the opposite side of the jet propulsion unit.

16. A watercraft comprising a hull defining a pump chamber formed on an underside of the hull, the pump chamber extending from a front wall and terminating at an aft opening, a jet propulsion unit positioned at least partially within the pump chamber and arranged generally to extend along a longitudinal axis, the jet propulsion unit having a discharge nozzle positioned near the aft opening of the pump chamber to discharge water to propel the watercraft, a ride plate attached to the underside of the hull and sized to at least partially close an underside of the pump chamber, the ride plate including an aperture that is offset to one side of a vertical plane that contains the longitudinal axis, and a speed sensor positioned such that at least a portion of the speed sensor is exposed below the ride plate through the aperture.

17. A watercraft as in claim 16, wherein the aperture lies near the front wall of the pump chamber, and the speed sensor is mounted to the front wall.

18. A watercraft as in claim 16, wherein the speed sensor includes a paddle wheel having a plurality of blades and a rotation detector cooperating with the paddle wheel to detect rotation of the paddle wheel.

19. A watercraft as in claim 18, wherein the paddle wheel includes at least two blades of opposite magnetic polarity, and the detector is a Hall-effect element that is influenced by the polarity of the blades.

20. A watercraft as in claim 1, wherein the aft opening of the pump chamber is generally located at an aft end of the hull.

21. A watercraft as in claim 1, wherein the discharge nozzle of the jet propulsion unit extends through the aft opening of the pump chamber.

* * * * *

UNITED STATES PATENT AND TRADEMARK OFFICE
CERTIFICATE OF CORRECTION

PATENT NO. : 5,894,087
DATED : April 13, 1999
INVENTOR(S) : Kenichi Ohtuka and Sumihiro Takashima It is certified that error appears in the above-identified patent and that said Letters Patent is hereby corrected as shown below:

Column 18,
Line 6, please delete the word "desirably".

Signed and Sealed this

Seventeenth Day of July, 2001

*Attest:*

Nicholas P. Godici

NICHOLAS P. GODICI
*Attesting Officer*    Acting Director of the United States Patent and Trademark Office